(12) United States Patent
Koga

(10) Patent No.: US 12,327,872 B2
(45) Date of Patent: Jun. 10, 2025

(54) ALL-SOLID BATTERY INCLUDING LINE-SHAPED STRUCTURAL DEFECT IN SOLID ELECTROLYTE LAYER OR CURRENT COLLECTOR

(71) Applicant: Panasonic Intellectual Property Management Co., Ltd., Osaka (JP)

(72) Inventor: Eiichi Koga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 565 days.

(21) Appl. No.: 17/683,402

(22) Filed: Mar. 1, 2022

(65) Prior Publication Data

US 2022/0190349 A1  Jun. 16, 2022

Related U.S. Application Data

(63) Continuation of application No. PCT/JP2020/006322, filed on Feb. 18, 2020.

(30) Foreign Application Priority Data

Sep. 17, 2019 (JP) .................................. 2019-168658

(51) Int. Cl.
*H01M 4/70* (2006.01)
*H01M 4/13* (2010.01)
(Continued)

(52) U.S. Cl.
CPC .............. *H01M 4/70* (2013.01); *H01M 4/13* (2013.01); *H01M 10/0525* (2013.01); *H01M 10/0585* (2013.01); *H01M 2300/0065* (2013.01)

(58) Field of Classification Search
CPC ...... H01M 4/70; H01M 4/13; H01M 10/0525; H01M 10/0585
(Continued)

(56) References Cited

U.S. PATENT DOCUMENTS

2002/0071987 A1   6/2002   Kezuka et al.
2015/0243962 A1   8/2015   Hiroki et al.
(Continued)

FOREIGN PATENT DOCUMENTS

JP    2001-266894    9/2001
JP    2010-080214    4/2010
(Continued)

OTHER PUBLICATIONS

The Indian OA dated Feb. 23, 2024 for the related Indian Patent Application No. 202247012135.
(Continued)

*Primary Examiner* — Sean P Cullen
(74) *Attorney, Agent, or Firm* — Rimon P.C.

(57) ABSTRACT

A battery includes an electrode layer, a counter electrode layer facing the electrode layer, and a solid electrolyte layer located between the electrode layer and the counter electrode layer. The electrode layer includes an electrode current collector and an electrode active material layer located between the electrode current collector and the solid electrolyte layer and having an area smaller than those of the electrode current collector and the solid electrolyte layer in plan view. In a first region including the electrode active material layer and a second region outside the first region in plan view, the solid electrolyte layer covers the outside of the electrode active material layer and is in contact with the electrode current collector in the second region, and the electrode current collector or the solid electrolyte layer includes at least one structural defect portion in a line shape in plan view in the second region.

13 Claims, 8 Drawing Sheets

(51) Int. Cl.
H01M 10/0525 (2010.01)
H01M 10/0585 (2010.01)

(58) Field of Classification Search
USPC .............................. 429/162, 304, 305, 322
See application file for complete search history.

(56) References Cited

U.S. PATENT DOCUMENTS

2019/0097208 A1* 3/2019 Kawase ............. H01M 10/052
2019/0280337 A1* 9/2019 Narita .................. H01M 4/662

FOREIGN PATENT DOCUMENTS

| JP | 2010080214 A | * | 4/2010 |
| JP | 2017183120 A | * | 10/2017 |
| JP | 2019-061952 | | 4/2019 |

OTHER PUBLICATIONS

International Search Report of PCT application No. PCT/JP2020/006322 dated Apr. 14, 2020.

* cited by examiner

ALL-SOLID BATTERY INCLUDING LINE-SHAPED STRUCTURAL DEFECT IN SOLID ELECTROLYTE LAYER OR CURRENT COLLECTOR

BACKGROUND

1. Technical Field

The present disclosure relates to a battery.

2. Description of the Related Art

Japanese Unexamined Patent Application Publication No. 2010-080214 (PTL 1) discloses an all-solid battery including a current collector provided with a groove. Japanese Unexamined Patent Application Publication No. 2001-266894 (PTL 2) discloses a nonaqueous electrolyte battery having a current collector provided with a notch.

SUMMARY

In known technologies, a highly reliable battery is required.

One non-limiting and exemplary embodiment provides a battery having improved reliability.

In one general aspect, the techniques disclosed here feature a battery including an electrode layer, a counter electrode layer disposed to face the electrode layer and a solid electrolyte layer located between the electrode layer and the counter electrode layer, wherein the electrode layer includes a current collector and an active material layer located between the current collector and the solid electrolyte layer and having an area smaller than those of the current collector and the solid electrolyte layer in plan view, wherein in plan view, when a region where the active material layer is located is designated as a first region and a region outside the first region is designated as a second region, the solid electrolyte layer covers the outside of the active material layer in plan view and is in contact with the current collector in the second region, and the current collector or the solid electrolyte layer includes at least one structural defect portion having a line shape in plan view in the second region.

According to the present disclosure, it is possible to improve the reliability of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Overview of the Present Disclosure

Figure 1:
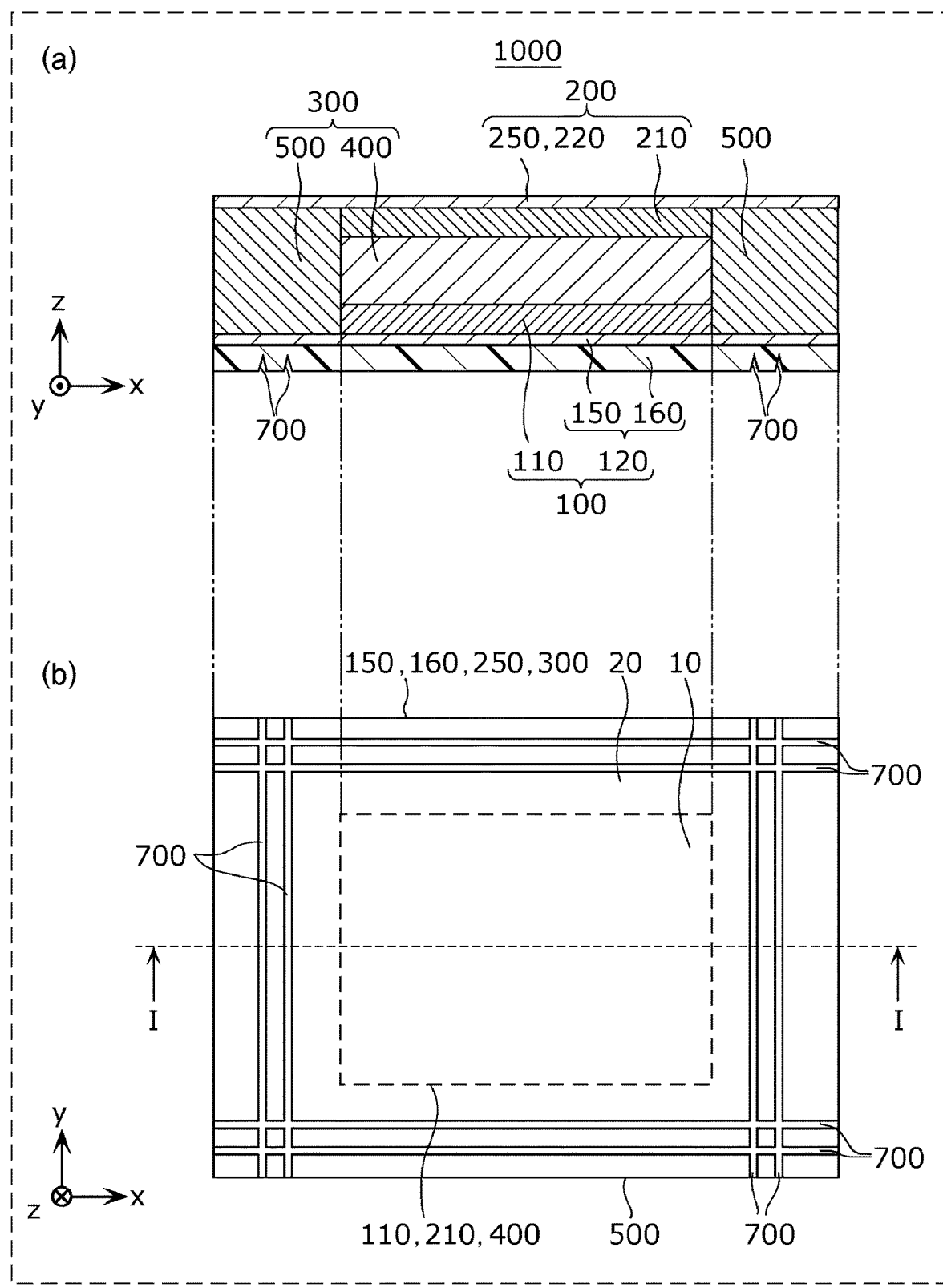
FIG. 1 illustrates diagrams showing a schematic configuration of a battery according to an Embodiment 1.

The battery according to an aspect of the present disclosure includes:
  an electrode layer;
  a counter electrode layer disposed to face the electrode layer; and
  a solid electrolyte layer located between the electrode layer and the counter electrode layer, wherein
  the electrode layer includes:
    a current collector; and
    an active material layer located between the current collector and the solid electrolyte layer and having an area smaller than those of the current collector and the solid electrolyte layer in plan view, wherein
  in plan view, when a region where the active material layer is located is designated as a first region and a region outside the first region is designated as a second region,
  the solid electrolyte layer covers the outside of the active material layer in plan view and is in contact with the current collector in the second region, and
  the current collector or the solid electrolyte layer includes at least one structural defect portion having a line shape in plan view in the second region.

Consequently, the current collector or the solid electrolyte layer of the battery includes a structural defect portion in the second region outside the active material layer in plan view. Accordingly, when an external impact or stress is applied to the battery, the battery is likely to be damaged or bent selectively at the structural defect portion located in the second region, before the first region in which the active material layer is located is damaged or bent. Accordingly, since a stress from the outside is unlikely to affect the active material layer, the active material layer is prevented from being damaged. As a result, the portion of a power generation element including the active material layer is protected, and short circuit and burnout of the battery due to contact of the active material layer of the electrode layer with the counter electrode layer are prevented. Accordingly, the reliability of the battery is improved.

The at least one structural defect portion may be, for example, a line-shaped groove.

Consequently, the strength, the shape, the direction, etc. when damage occurs in the structural defect portion can be easily adjusted by, for example, the depth of a groove, the length of a groove formed in a line shape, and the number of grooves.

The at least one structural defect portion may be, for example, a plurality of holes arranged in a line shape.

Consequently, the strength, the shape, the direction, etc. when damage occurs in the structural defect portion can be easily adjusted by, for example, the shape, depth, and number of a plurality of holes.

The at least one structural defect portion may be, for example, a line-shaped slit.

Consequently, since the structural defect portion can be formed only by making a slit, there is no need to carve out the material, and the structural defect portion can be easily formed.

As the at least one structural defect portion, for example, a plurality of structural defect portions may be formed along an outer periphery of the first region in plan view.

Consequently, since a plurality of structural defect portions is formed, when an external impact or stress is applied to the battery, the battery is likely to be bent more selectively at the structural defect portion.

The at least one structural defect portion may be formed, for example, so as to surround an outer periphery of the first region in plan view.

Consequently, since the active material layer is surrounded by the structural defect portion in plan view, the battery is likely to be bent selectively at the structural defect portion for a wide range of external stress directions to the battery.

At least one of ends of the at least one structural defect portion may correspond to an outer periphery of the current collector or the solid electrolyte layer in plan view.

Consequently, since the structural defect portion is formed so as to extend to an outer periphery of the current collector or the solid electrolyte layer, when an external impact or stress is applied to the battery, the battery is likely to be damaged starting from an end of the structural defect portion and is likely to be bent more selectively at the structural defect portion.

The current collector includes, for example, a current collector layer in contact with the active material layer and a substrate in contact with a surface of the current collector layer opposite to the surface facing the active material layer, and the at least one structural defect portion may be formed on the substrate.

Consequently, since the current collector includes a substrate, the battery is structurally strengthened by the substrate. Accordingly, the reliability of the battery is more improved.

The at least one structural defect portion may be formed, for example, on a surface of the substrate opposite to the surface facing the current collector layer.

Consequently, when the substrate is bent at the structural defect portion by, for example, a stress from the outside, the tip of the bent part of the substrate tends to turn to the outer direction side of the battery. Accordingly, when the substrate is bent and broken, the debris of the substrate is prevented from invading into the inside of the battery. Accordingly, short circuit of the battery is further prevented, and the reliability of the battery is more improved.

The current collector may further include, for example, an auxiliary substrate that is located in the first region and is in contact with a surface of the substrate opposite to the surface facing the current collector layer.

Consequently, the active material layer located in the first region is more certainly protected by the auxiliary substrate. Accordingly, when an external impact or stress is applied to the battery, bending is likely to occur more selectively at the structural defect portion. Accordingly, the reliability of the battery is more improved.

The at least one structural defect portion may be formed, for example, in the solid electrolyte layer.

Consequently, even if the battery does not include a substrate, when an external impact or stress is applied to the battery, the battery is damaged or bent selectively at the structural defect portion formed in the solid electrolyte in the second region, before the first region in which the active material layer is located is damaged or bent. Accordingly, since a stress from the outside is unlikely to affect the active material layer, the active material layer is prevented from being damaged. As a result, the portion of a power generation element including the active material layer is protected, and short circuit and burnout of the battery due to contact of the active material layer of the electrode layer with the counter electrode layer are prevented. Accordingly, the reliability of the battery can be improved. In addition, the battery is not required to have a substrate that allows to easily form a structural defect portion. Accordingly, since a substrate that does not contribute to power generation need not be provided, the energy density of the battery can be increased.

The at least one structural defect portion may be formed, for example, on the surface of the solid electrolyte layer facing the current collector.

Consequently, when an external impact or stress is applied to the battery, since it is likely to be damaged starting from the structural defect portion formed on the surface of the solid electrolyte layer facing the current collector, the battery is likely to be bent more selectively at the structural defect portion. Accordingly, the reliability of the battery is more improved.

The solid electrolyte layer may include, for example, a solid electrolyte having a lithium ion conductivity.

Consequently, in a lithium ion battery including a solid electrolyte, the reliability of the battery can be improved.

Embodiments will now be specifically described with reference to the drawings.

Incidentally, the embodiments described below all show comprehensive or specific examples. Accordingly, the numerical values, shapes, materials, components, arrangement positions and connection forms of components, and so on shown in the following embodiments are examples and are not intended to limit the present disclosure. In addition, among the components in the following embodiments, the components not described in the independent claims indicating the highest concept are described as optional components.

In the present specification, terms indicating relationships between elements, such as parallel, terms indicating shapes of elements, such as rectangles, and numerical ranges are not expressions expressing only strict meanings, but are expressions meaning that a substantially equivalent range, for example, a difference of about several percent, is included.

In addition, each drawing is not necessarily exactly illustrated. In each drawing, substantially the same configurations are designated by the same reference signs, and duplicate explanation is omitted or simplified.

In the present specification and the drawings, an x-axis, a y-axis, and a z-axis indicate three axes of a three-dimensional orthogonal coordinate system. In each embodiment, the z-axis direction is the thickness direction of a battery. The positive direction of the z-axis is designated as the z-axis direction upper side, and the negative direction of the z-axis is designated as the z-axis direction lower side. In the present specification, the term "thickness direction" refers to a direction perpendicular to the plane on which each layer is stacked.

In the present specification, the term "plan view" means a case of viewing a battery along the stacking direction of the battery, and the term "thickness" in the present specification means the length of a battery and each layer in the stacking direction.

In the present specification, the "in" and the "out" in "inside" and "outside" are the inside and the outside when a battery is viewed along the stacking direction in the battery.

In the present specification, the terms "top" and "bottom" in the configuration of a battery do not refer to the upward direction (vertically above) and the downward direction (vertically below) in absolute space recognition, but are used as terms defined by relative positional relationships based on the stacking order in a stacking configuration. The terms "upper" and "lower" apply not only when two components are disposed apart from each other and another component lies between the two components but also when two components are disposed close to each other and the two components are in contact with each other.

Embodiment 1

Overview of Layered Battery

First, a battery according to the present embodiment will be described.

FIG. 1 illustrates diagrams showing a schematic configuration of a battery according to the present embodiment. Specifically, FIG. 1(a) is a cross-sectional view of a battery 1000 according to the present embodiment, and FIG. 1(b) is a plan view of the battery 1000 viewed from the z-axis direction lower side. FIG. 1(a) shows a cross section at the position indicated by the I-I line in FIG. 1(b).

As shown in FIG. 1, the battery 1000 includes an electrode layer 100, a counter electrode layer 200 disposed to face and be parallel to the electrode layer 100, and a solid electrolyte layer 300 located between the electrode layer 100 and the counter electrode layer 200. The battery 1000 is, for example, an all-solid battery.

The electrode layer 100 includes an electrode current collector 120 and an electrode active material layer 110 located between the electrode current collector 120 and the solid electrolyte layer 300 and having an area smaller than those of the electrode current collector 120 and the solid electrolyte layer 300 in plan view. The electrode current collector 120 includes an electrode current collector layer 150 in contact with the electrode active material layer 110 and a substrate 160 in contact with a surface of the electrode current collector layer 150 opposite to the surface facing the electrode active material layer 110. Incidentally, in the present specification, the electrode current collector 120 and each electrode current collector according to the present disclosure described below are examples of the current collector, the electrode active material layer 110 and each electrode active material layer according to the present disclosure described below are examples of the active material layer, and the electrode current collector layer 150 and each electrode current collector layer according to the present disclosure described below are examples of the current collector layer.

The counter electrode layer 200 is disposed to face the electrode layer 100 via the solid electrolyte layer 300 and is a layer functioning as a counter electrode of the electrode layer 100. The counter electrode layer 200 includes a counter electrode current collector 220 and a counter electrode active material layer 210 located between the counter electrode current collector 220 and the solid electrolyte layer 300 and having an area smaller than those of the counter electrode current collector 220 and the solid electrolyte layer 300 in plan view. The counter electrode current collector 220 includes a counter electrode current collector layer 250 in contact with the counter electrode active material layer 210.

That is, the battery 1000 has a structure in which a substrate 160, an electrode current collector layer 150, an electrode active material layer 110, a solid electrolyte layer 300, a counter electrode active material layer 210, and a counter electrode current collector layer 250 are stacked in this order. The substrate 160, the electrode current collector layer 150, the electrode active material layer 110, the solid electrolyte layer 300, the counter electrode active material layer 210, and the counter electrode current collector layer 250 have rectangular shapes in plan view.

A case of designating the region where the electrode active material layer 110 is located as a first region 10 and designating the region outside the first region 10 as a second region 20 in plan view will now be described. That is, in plan view, the region where the electrode active material layer 110 is located in the first region 10, and the region outside the first region 10 is the second region 20.

In the present embodiment, among the electrode layer 100 and the counter electrode layer 200, for example, one is a positive electrode layer including a positive electrode active material layer and a positive electrode current collector including a positive electrode current collector layer, and the other is a negative electrode layer including a negative electrode active material layer and a negative electrode current collector including a negative electrode current collector layer. Accordingly, one of (a) the electrode layer 100, the electrode active material layer 110, the electrode current collector 120, and the electrode current collector layer 150 and (b) the counter electrode layer 200, the counter electrode active material layer 210, the counter electrode current collector 220, and the counter electrode current collector layer 250 functions as a positive electrode layer, a positive electrode active material layer, a positive electrode current collector, and a positive electrode current collector layer, and the other functions as a negative electrode layer, a negative electrode active material layer, a negative electrode current collector, and a negative electrode current collector layer. Hereinafter, the positive electrode active material layer and the negative electrode active material layer may be each simply referred to as "active material layer". The positive electrode current collector and the negative electrode current collector may be each simply referred to as "current collector". The positive electrode current collector layer and the negative electrode current collector layer may be each simply referred to as "current collector layer".

The bottom surface of the electrode active material layer 110 is in contact with the electrode current collector layer 150 of the electrode current collector 120, and the top surface of the electrode active material layer 110 is in contact with the solid electrolyte layer 300. The electrode active material layer 110 faces the counter electrode active material layer 210 with the solid electrolyte layer 300 therebetween, and the electrode active material layer 110, the counter electrode active material layer 210, and the solid electrolyte layer 300 form a power generation element portion in the battery 1000. The side surface of the electrode active material layer 110 is also in contact with the solid electrolyte layer 300. The electrode active material layer 110 is located at the same position as that of the counter electrode active material layer 210 in plan view. In addition, the electrode active material layer 110 has an area smaller than those of the solid electrolyte layer 300, the electrode current collector layer 150, the substrate 160, and the counter electrode current collector layer 250 in plan view. The electrode active material layer 110 is located inside the solid electrolyte layer 300, the electrode current collector layer 150, the substrate 160, and the counter electrode current collector layer 250 in plan view.

The top surface of the counter electrode active material layer 210 is in contact with the counter electrode current collector layer 250 of the counter electrode current collector 220, and the bottom surface of the counter electrode active material layer 210 is in contact with the solid electrolyte layer 300. In addition, the side surface of the counter electrode active material layer 210 is also in contact with the solid electrolyte layer 300. The counter electrode active material layer 210 is located at the same position as that of the electrode active material layer 110 in plan view. In addition, the counter electrode active material layer 210 has an area smaller than those of the solid electrolyte layer 300, the electrode current collector layer 150, the substrate 160, and the counter electrode current collector layer 250 in plan view. The counter electrode active material layer 210 is located inside the solid electrolyte layer 300, the electrode current collector layer 150, the substrate 160, and the counter electrode current collector layer 250 in plan view.

As described above, in the battery 1000, among the electrode active material layer 110 and the counter electrode active material layer 210, for example, one is a positive electrode active material layer, and the other is a negative electrode active material layer.

The positive electrode active material layer at least includes a positive electrode active material. That is, the positive electrode active material layer is a layer that is mainly constituted of a positive electrode material, such as a positive electrode active material. The positive electrode active material is a material in which ions of a metal, such as lithium (Li) or magnesium (Mg), are inserted into or released from the crystal structure at a potential higher than that of the negative electrode and is concomitantly oxidized or reduced. The type of the positive electrode active material can be appropriately selected according to the type of the battery, and a known positive electrode active material can be used. The positive electrode active material is, for example, a compound including lithium and a transition metal element, such as an oxide including lithium and a transition metal element and a phosphate compound including lithium and a transition metal element. As the oxide including lithium and a transition metal element, for example, a lithium nickel complex oxide, such as $LiNi_xM_{1-x}O_2$ (here, M is at least one element selected from the group consisting of Co, Al, Mn, V, Cr, Mg, Ca, Ti, Zr, Nb, Mo, and W, and x is defined as $0<x\leq1$); a layered oxide, such as lithium cobaltate ($LiCoO_2$), lithium nickelate ($LiNiO_2$), and lithium manganate ($LiMn_2O_4$); or lithium manganate having a spinel structure ($LiMn_2O_4$, $Li_2MnO_3$, and $LiMnO_2$) is used. As the phosphate compound including lithium and a transition metal element, for example, lithium iron phosphate having an olivine structure ($LiFePO_4$) is used. As the positive electrode active material, a sulfide, such sulfur (S) and lithium sulfide ($Li_2S$), can also be used, and in such a case, for example, a positive electrode active material particle coated with or containing lithium niobate ($LiNbO_3$) can be used as the positive electrode active material. As the positive electrode active material, these materials may be used alone, or a combination of two or more of these materials may be used.

As described above, the positive electrode active material layer may contain at least a positive electrode active material. The positive electrode active material layer may be a mixture layer constituted of a mixture of a positive electrode active material and another additive material. As the additive material, for example, a solid electrolyte, such as an inorganic solid electrolyte and a sulfide solid electrolyte, a conducting assistant, such as acetylene black, and a binder, such as polyethylene oxide and polyvinylidene fluoride, can be used. In the positive electrode active material layer, the ionic conductivity of the positive electrode active material layer can be improved by mixing a positive electrode active material and another additive material, such as a solid electrolyte, at a predetermined ratio, and the electron conductivity can also be improved.

The thickness of the positive electrode active material layer is, for example, 5 μm or more and 300 μm or less.

The negative electrode active material layer at least includes a negative electrode active material. That is, the negative electrode active material layer is a layer that is mainly constituted of a negative electrode material, such as a negative electrode active material. The negative electrode active material is a material in which ions of a metal, such as lithium (Li) or magnesium (Mg), are inserted into or released from the crystal structure at a potential lower than that of the positive electrode and is concomitantly oxidized or reduced. The type of the negative electrode active material can be appropriately selected according to the type of the battery, and a known negative electrode active material can be used. As the negative electrode active material is, for example, a carbon material, such as natural graphite, artificial graphite, graphite carbon fibers, and resin heat-treated carbon, or an alloy material to be mixed with a solid electrolyte can be used. As the alloy material, for example, a lithium alloy, such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$, and $LiC_6$, an oxide of lithium and a transition metal element, such as lithium titanate ($Li_4Ti_5O_{12}$), or a metal oxide, such as zinc oxide (ZnO) and silicon oxide ($SiO_x$), can be used. As the negative electrode active material, these materials may be used alone, or a combination of two or more of these materials may be used.

As described above, the negative electrode active material layer may contain at least a negative electrode active material. The negative electrode active material layer may be a mixture layer constituted of a mixture of a negative electrode active material and another additive material. As the additive material, for example, a solid electrolyte, such as an inorganic solid electrolyte and a sulfide solid electrolyte, a conducting assistant, such as acetylene black, and a binder, such as polyethylene oxide and polyvinylidene fluoride, can be used. In the negative electrode active material layer, the ionic conductivity of the negative electrode active material layer can be improved by mixing a negative electrode active material and another additive material, such as a solid electrolyte, at a predetermined ratio, and the electron conductivity can also be improved.

The thickness of the negative electrode active material layer is, for example, 5 or more and 300 μm or less.

The electrode current collector 120 is a current collector that is used for extracting a current from the electrode active material layer 110, and the counter electrode current collector 220 is a current collector that is used for extracting a current from the counter electrode active material layer 210.

The electrode current collector 120 is constituted of an electrode current collector layer 150 having conductivity and a substrate 160 supporting the electrode current collector layer 150. For example, lead wire for connecting with the outside may be attached to the electrode current collector layer 150 or may be attached to the substrate 160. Although the details will be described later, the electrode current collector 120 includes a structural defect portion 700 having a line-like shape in plan view in the second region 20. Specifically, the structural defect portion 700 is formed in the substrate 160.

The counter electrode current collector 220 is constituted of only the counter electrode current collector layer 250 having conductivity.

The positions of the electrode current collector layer 150, the substrate 160, and the counter electrode current collector layer 250 are the same in plan view.

As described above, in the battery 1000, among the electrode current collector layer 150 and the counter electrode current collector layer 250, for example, one is a positive electrode current collector layer, and the other is a negative electrode current collector layer. The positive electrode current collector layer and the negative electrode current collector layer may be formed of materials having conductivity without particular limitation. In the current collector layer, for example, foil-like, plate-like, or net-like material made of stainless steel, nickel, aluminum, iron, titanium, copper, palladium, gold, platinum, or an alloy of two or more thereof may be used. The material of the current collector layer may be appropriately selected considering that the material does not melt and decompose during the manufacturing process, at the operating temperature, and at the operating pressure and considering the battery performance potential applied to the current collector layer and the conductivity. The material of the current collector layer may be also selected according to the required tensile strength and heat resistance. The current collector layer may be high-strength electrolytic copper foil or a clad material composed of stacked different kinds of metal foil. The thickness of the current collector layer is, for example, 10 μm or more and 100 μm or less.

The substrate 160 is a plate-like substrate. The material of the substrate 160 is, for example, ceramic, such as alumina, or a resin. When the substrate 160 is a ceramic substrate of which the main material is ceramic, as the material of the ceramic substrate, for example, a material of which the main component is alumina, mullite, zirconia, nitride ceramic, and zinc oxide (ZnO) can be used. As the substrate 160, a resin substrate of which the main material is a resin or a substrate composed of a resin substrate and a ceramic substrate bonded to each other can also be used.

The substrate 160 is a substrate having a mechanism in which the substrate is likely to be damaged or bent by an external stress, unlike general substrates, and as a result is likely to be fractionated. In the substrate 160, a line-shaped groove is formed as the structural defect portion 700 that is a position to be easily damaged. That is, the substrate 160 is likely to be bent selectively at the structural defect portion 700. The structural defect portion 700 is a line-shaped groove in plan view. The structural defect portion 700 may be a plurality of holes arranged in a line shape, such as perforated holes, in plan view.

The top surface and the bottom surface of the substrate 160 may have conductivity. The substrate 160 functions as a terminal electrode by electrically connecting the top surface and the bottom surface of the substrate 160, for example, vis a conductor that is a via hole or a through hole formed in the substrate. In addition, the side surface of the substrate 160 may also have conductivity. The substrate 160 may be formed of a conductor.

In the battery 1000, the surface of the substrate 160 facing the electrode current collector layer 150 is joined to the electrode current collector layer 150. In other words, the top surface of the substrate 160 is joined to the bottom surface of the electrode current collector layer 150 in the z-axis direction. Incidentally, although the electrode current collector 120 includes the substrate 160 in FIG. 1, the counter electrode current collector 220 may include the substrate 160. Alternatively, both the electrode current collector 120 and the counter electrode current collector 220 may each include the substrate 160.

Although it is not shown in the drawing, a conductor with low resistance may be used at the joint between the substrate 160 and the electrode current collector layer 150. For example, as the conductor that is used for joining the substrate 160 and the electrode current collector layer 150, a cured conductive resin (conductive paste) containing conductive metal particles, such as silver, may be used. The conductive resin may be a material that can ensure the conductivity and joining property within the operating temperature range of the battery 1000 and during the manufacturing process. The substrate 160 and the electrode current collector layer 150 may be joined to each other by solder or conductive tape. Alternatively, the substrate 160 and the electrode current collector layer 150 may be joined to each other by a material that is used in the electrode current collector layer 150. Alternatively, the substrate 160 and the electrode current collector layer 150 may be directly joined to each other by, for example, heat welding or pressure bonding. The joint between the substrate 160 and the electrode layer 100 may be made of a material and have a configuration (thickness) providing durability such that the life characteristics and the battery characteristics are not affected when a current is applied at the maximum rate required under the operating environment.

The material of the substrate 160 may be a material that is unlikely to be deformed compared to the material of the electrode current collector layer 150 by the pressure applied when joining both. That is, the substrate 160 may be harder than the electrode current collector layer 150. By this configuration, the electrode current collector layer 150 is deformed along the substrate plane and adheres to the substrate when a bonding pressure is applied, and the joined state is likely to be maintained without peeling off when an external stress is applied to the battery 1000. Accordingly, the battery 1000 is likely to be bent selectively at the structural defect portion 700 of the substrate 160.

In the battery 1000, the material of the substrate 160 may include the same material as that of the electrode current collector layer 150. The surface of the substrate 160 facing the electrode current collector layer 150 may be formed with the same pattern of the material of the electrode current collector layer 150. Consequently, since the difference in thermal expansion coefficient between the substrate 160 and the electrode current collector layer 150 can be adjusted, the joined interface between the substrate 160 and the electrode current collector layer 150 can be prevented from, for example, peeling off due to hot-cold cycles, and the joining reliability can be more improved. Consequently, even after hot-cold cycles, the substrate 160 and the electrode current collector layer 150 are not peeled off from each other, and the joined state is likely to be maintained, and when an external stress is applied to the battery 1000, bending is likely to occur selectively at the structural defect portion 700 of the substrate 160.

The function of the substrate 160 and the structural defect portion 700 will now be described in more detail. The substrate 160 usually protects the battery 1000 and structurally reinforces the battery 1000. In the substrate 160, a groove is formed in a line shape in plan view as the structural defect portion 700 that is easily damaged by an external stress. In more detail, a plurality of grooves is formed in a line shape as structural defect portions 700 for bending and fractionation on a surface of the substrate 160 opposite to the surface facing the electrode current collector layer 150 along an outer periphery of the first region 10. Accordingly, the substrate 160 is likely to be damaged or bent at the structural defect portion 700 by an external stress.

Since the structural defect portions 700 are thus formed on a surface of the substrate 160 opposite to the surface facing the electrode current collector layer 150, when an external stress is applied to the battery 1000, the substrate 160 is likely to be bent or fractionated selectively at the structural defect portion 700 formed in the second region 20 in a direction not entering the inside of the battery 1000, before the electrode active material layer 110 and the counter electrode active material layer 210 of the battery 1000 are damaged. Consequently, since a stress from the outside is unlikely to affect the electrode active material layer 110 and the counter electrode active material layer 210, the electrode active material layer 110 and the counter electrode active material layer 210 are prevented from being damaged. As a result, short circuit due to contact between the electrode active material layer 110 and the counter electrode active material layer 210 is prevented.

The structural defect portion 700 is formed such that both ends extend to an outer periphery of the substrate 160 in plan view. In other words, both ends of the structural defect portion 700 correspond to the outer peripheries of the electrode current collector layer 150, the substrate 160, and the solid electrolyte layer 300 in plan view. Consequently, when a stress is applied from the outside, the substrate 160 is likely to be damaged starting from an end of the structural defect portion 700. Incidentally, the structural defect portion 700 may be formed such that one end extends to an outer periphery of the substrate 160 in plan view.

The structural defect portion 700 is formed, for example, such that the bending resistance strength of the substrate 160 in the second region 20 is smaller than the bending resistance strength of the battery 1000 in the first region 10. Alternatively, the structural defect portion 700 may be formed such that the bending resistance strength of the battery 1000 in the second region 20 is smaller than the bending resistance strength of the battery 1000 in the first region 10. Alternatively, the structural defect portion 700 may be formed such that the bending resistance strength of the substrate 160 in the second region 20 is smaller than the bending resistance strength of the power generation element portion consisting of the electrode active material layer 110, the counter electrode active material layer 210, and the solid electrolyte layer 300 of the battery 1000.

The value of bending resistance strength is measured by performing bending resistance strength measurement such as standard three-point bending of ceramic, and the bending resistance strengths at the respective points are set based on the relative relationship of the values. Accordingly, for example, the bending resistance strengths of the substrate 160 and the power generation element portion of the battery 1000 are individually measured, and the bending resistance strength is set. Thus, the position that is desired to be selectively bent and the position that is desired to be protected when an external stress is applied to the battery 1000 are set.

As shown in FIG. 1, a plurality of structural defect portions 700 may be formed. Consequently, it is possible to adjust the position of damage in the structural defect portions 700 and the bending resistance strength of the structural defect portions 700 of the substrate 160. In FIG. 1, each of two structural defect portions 700 is formed along each of the edges constituting a rectangle of the first region 10 in plan view, but the number is not limited thereto. One structural defect portion 700 may be formed along each edge, or two or more structural defect portions 700 may be formed along each edge. In addition, the structural defect portion 700 need not to be formed along all the edges constituting the rectangle of the first region 10, and may be formed along at least one edge.

As shown in FIG. 1, the structural defect portion 700 may be formed along an outer periphery of the first region in plan view. Consequently, since the structural defect portion is located along an outer periphery of the first region 10, influence when the battery is bent at the structural defect portion 700 is unlikely to reach the electrode active material layer 110 and the counter electrode active material layer 210. The structural defect portion 700 may be formed, as shown in FIG. 1, so as to surround an outer periphery of the first region 10 in plan view. Consequently, since the electrode active material layer 110 and the counter electrode active material layer 210 of the power generation element portion are surrounded by the structural defect portion 700, the battery 1000 is likely to be bent at the structural defect portion 700 against a wide range of external stress directions to the battery 1000, and the power generation element portion can be protected.

The cross-sectional shape of the groove as the structural defect portion 700 can be machined into, for example, a V-shape, U-shape, a semicircular, or concave shape (squared U shape). The strength, shape, direction, etc. when the structural defect portion 700 is damaged can be easily adjusted by, for example, the cross-sectional shape of the groove, the depth of the groove, the length of the groove formed in a line shape, and the number of the grooves.

The groove as the structural defect portion 700 is a portion where the flat surface of the substrate 160 is locally recessed. The width of the groove is, for example, 5 µm or more and 100 µm or less. The depth of the groove is, for example, 5% or more and 50% or less of the thickness of the substrate 160. When the width and the depth of the groove are within such ranges, the battery 1000 is likely to be bent selectively at the structural defect portion 700.

The structural defect portion 700 is not limited to a line-shaped groove in plan view and may be, for example, a plurality of holes machined and arranged in a line shape. The structural defect portion 700 may be a slit in a line shape. The structural defect portion 700 is a portion where discontinuous parts of the material constituting the substrate 160 are arranged in a row. The discontinuous parts arranged in a row may be continuously arranged in a row or may include a discontinuous portion.

The groove constituting the structural defect portion 700 may be formed also on the surface of the substrate 160 facing the electrode active material layer 110, i.e., the top surface of the substrate 160, in addition to a surface of the substrate 160 opposite to the surface facing the electrode active material layer 110, i.e., the bottom surface of the substrate 160. In such a case, the depth of the groove formed in the bottom surface of the substrate 160 may be larger than that of the groove formed in the top surface of the substrate 160. In addition, the shapes of the grooves formed in the top and bottom surfaces of the substrate 160 may be different, for example, the groove in the bottom surface of the substrate 160 is formed with a V-shaped cross section, and the groove in the top surface of the substrate 160 is formed with a concave cross section.

Examples of the method for forming the structural defect portion 700 include a method using a dicing cutter or a diamond cutter. The method for forming the structural defect portion 700 may be a method for forming grooves or holes by laser machining.

As described above, formation of the structural defect portion 700 in the substrate 160 allows the battery 1000 to be easily damaged or bent selectively at the structural defect portion 700 formed in the substrate 160 in the second region 20 when a strong external impact or stress is applied to the battery 1000. That is, the battery 1000 is likely to be bent in the outside of the power generation element portion including the electrode active material layer 110, the counter electrode active material layer 210, etc. in plan view. Consequently, the electrode active material layer 110 and the counter electrode active material layer 210 are prevented from being damaged, and short circuit ad burnout of the battery 1000 due to contact between the electrode active material layer 110 and the counter electrode active material layer 210 are prevented. Accordingly, a battery 1000 with high safety can be realized. In particular, even in a large area and thinned battery, which is likely to cause damage of the battery, high safety can be realized.

The solid electrolyte layer 300 covers the outside of the electrode active material layer 110 and the counter electrode active material layer 210 in plan view and is in contact with the electrode current collector 120 and the counter electrode current collector 220 in the second region 20. Specifically, the solid electrolyte layer 300 includes a first solid electrolyte layer 400 located in the first region 10 and a second solid electrolyte layer 500 located in the second region 20. The solid electrolyte layer 300 is a layer for conducting ions, such as lithium ions.

The first solid electrolyte layer 400 is located between the electrode active material layer 110 and the counter electrode active material layer 210 and is in contact with the electrode active material layer 110 and the counter electrode active material layer 210. The first solid electrolyte layer 400 is located at the same position as those of the electrode active material layer 110 and the counter electrode active material layer 210 in plan view.

The second solid electrolyte layer 500 covers the outside of the electrode active material layer 110 and the counter electrode active material layer 210 in plan view and is in contact with the electrode current collector 120 and the counter electrode current collector 220 in the second region 20.

Incidentally, the first solid electrolyte layer 400 and the second solid electrolyte layer 500 may be separately formed or may form the solid electrolyte layer 300 in a unified fashion. The first solid electrolyte layer 400 and the second solid electrolyte layer 500 may be made of the same material or may be made of different materials.

The solid electrolyte layer 300 at least includes a solid electrolyte. The solid electrolyte layer 300 may include a solid electrolyte having a lithium ion conductivity. Specifically, the first solid electrolyte layer 400 and the second solid electrolyte layer 500 may both include a solid electrolyte. Incidentally, in the solid electrolyte layer 300, the first solid electrolyte layer 400 may be a layer including a solid electrolyte, and the second solid electrolyte layer 500 may be a layer not including a solid electrolyte. In such a case, for example, the second solid electrolyte layer 500 may be made of a sealing member, such as a resin. As the sealing member, for example, a known sealing member for batteries is used.

The solid electrolyte may be any known solid electrolyte having ionic conductivity for batteries. For example, a solid electrolyte that conducts metal ions, such lithium ions and magnesium ions, can be used. The solid electrolyte may be appropriately selected according to the conducting ion species. For example, an inorganic solid electrolyte, such as a sulfide solid electrolyte, an oxide solid electrolyte, or a halide solid electrolyte, can be used. As the sulfide solid electrolyte, for example, a lithium-containing sulfide, such as $Li_2S$—$P_2S_5$ based, $Li_2S$—$SiS_2$ based, $Li_2S$—$B_2S_3$ based, $Li_2S$—$GeS_2$ based, $Li_2S$—$SiS_2$—$LiI$ based, $Li_2S$—$SiS_2$—$Li_3PO_4$ based, $Li_2S$—$Ge_2S_2$ based, $Li_2S$—$GeS_2$—$P_2S_5$ based, and $Li_2S$—$GeS_2$—$ZnS$ based lithium-containing sulfides, can be used. These sulfide solid electrolytes have a lithium ion conductivity. As the oxide solid electrolyte, for example, a lithium-containing metal oxide, such as $Li_2O$—$SiO_2$ and $Li_2OSiO_2$—$P_2O_5$, a lithium-containing metal nitride, such as $Li_xP_yO_{1-z}N_z$, lithium phosphate ($Li_3PO_4$), and a lithium-containing transition metal oxide, such as lithium titanium oxide, can be used. These oxide solid electrolytes have a lithium ion conductivity. As the solid electrolyte, these materials may be used alone, or a combination of two or more of these materials may be used.

The solid electrolyte layer 300 may include a binder, such as polyethylene oxide and polyvinylidene fluoride, in addition to the solid electrolyte.

The thickness of the solid electrolyte layer 300 is, for example, 5 to 150 μm.

The solid electrolyte layer 300 may be configured as an aggregate of solid electrolyte particles. Alternatively, the solid electrolyte layer 300 may be configured of a heat treated structure of a solid electrolyte.

According to the configuration above, the battery 1000 includes an electrode current collector 120 including a line-shaped structural defect portion 700 in plan view in the second region 20. Specifically, the structural defect portion 700 is formed in a substrate 160 of the electrode current collector 120 in the second region 20. Consequently, even if an external stress is applied to the battery 1000, the battery 1000 is likely to be bent selectively at the structural defect portion 700 formed in the substrate 160 in the second region 20 located in the outside of the electrode active material layer 110 and the counter electrode active material layer 210. Consequently, an external stress is unlikely to affect the electrode active material layer 110 and the counter electrode active material layer 210, and the electrode active material layer 110 and the counter electrode active material layer 210 are prevented from being damaged. As a result, short circuit and burnout of the battery due to contact between the electrode active material layer 110 and the counter electrode active material layer 210 are prevented. Accordingly, the reliability of the battery 1000 is improved. In particular, since the reliability of a large area and thinned battery, which is likely to be damaged, can be improved, a large capacity battery having high energy density and high reliability can be realized.

That is, according to the configuration above, when a large area and thinned battery is damaged by application of a large stress from the outside, the second region 20 outside the power generation element portion is likely to be selectively bent and fractionated. Consequently, short circuit of the battery can be prevented. Consequently, a large-sized and thin battery having high safety can be realized.

In the above, although a case in which the electrode current collector layer 150 and the substrate 160 are disposed in contact with each other has been described, even when the counter electrode current collector layer 250 and the substrate 160 are disposed in contact with each other, the above-described effects are obtained by the same mechanism. That is, although the electrode current collector 120 includes the structural defect portion 700 in FIG. 1, the counter electrode current collector 220 may include the structural defect portion 700.

When the configuration of the battery 1000 according to the present embodiment and the structures of the batteries described in PTLs 1 and 2 are compared, there are the following differences.

In PTL 1, a groove is provided in a current collector corresponding the above-described current collector layer. However, there is no substrate, the groove provided to the current collector made of a metal is thinner than the solid electrolyte and the active material layer, and further the current collector has plastic deformation properties. Accordingly, the groove portion is not likely to be notably bent compared to other portions, and the battery cannot be bent selectively at the groove portion. In addition, the groove is formed at a position overlapping with the power generation element portion in plan view. Consequently, when a strong external stress is applied, even if the groove portion is bent, the power generation element portion is damaged. As a result, there is a risk that active material layers become into contact with each other to cause short circuit and burnout of the battery.

PTL 2 discloses a nonaqueous electrolyte battery in which a notch is formed in a current collector corresponding to the above-described current collector layer. This notch provides arbitrary flexibility at its position. That is, this notch is essentially different from the structural defect portion 700 for protecting the power generation element portion in an all-solid battery not having flexibility. Accordingly, even if a notch is provided to a current collector of an all-solid battery, there is a risk of damaging the power generation element portion, and there is still a problem in reliability against stress.

Unlike the above, in the battery 1000 according to the present embodiment, the problems described above do not occur. Furthermore, PTLs 1 and 2 do not disclose nor suggest the configuration described in the present embodiment in which a structural defect portion 700 protects the power generation element portion including an electrode active material layer 110 and a counter electrode active material layer 210 of a battery 1000.

MODIFICATION EXAMPLE 1

A Modification Example 1 of the Embodiment 1 will now be described. Incidentally, in the description of the following Modification Example 1, differences from the Embodiment 1 are mainly explained, and the explanation of common points is omitted or simplified.

Figure 2:
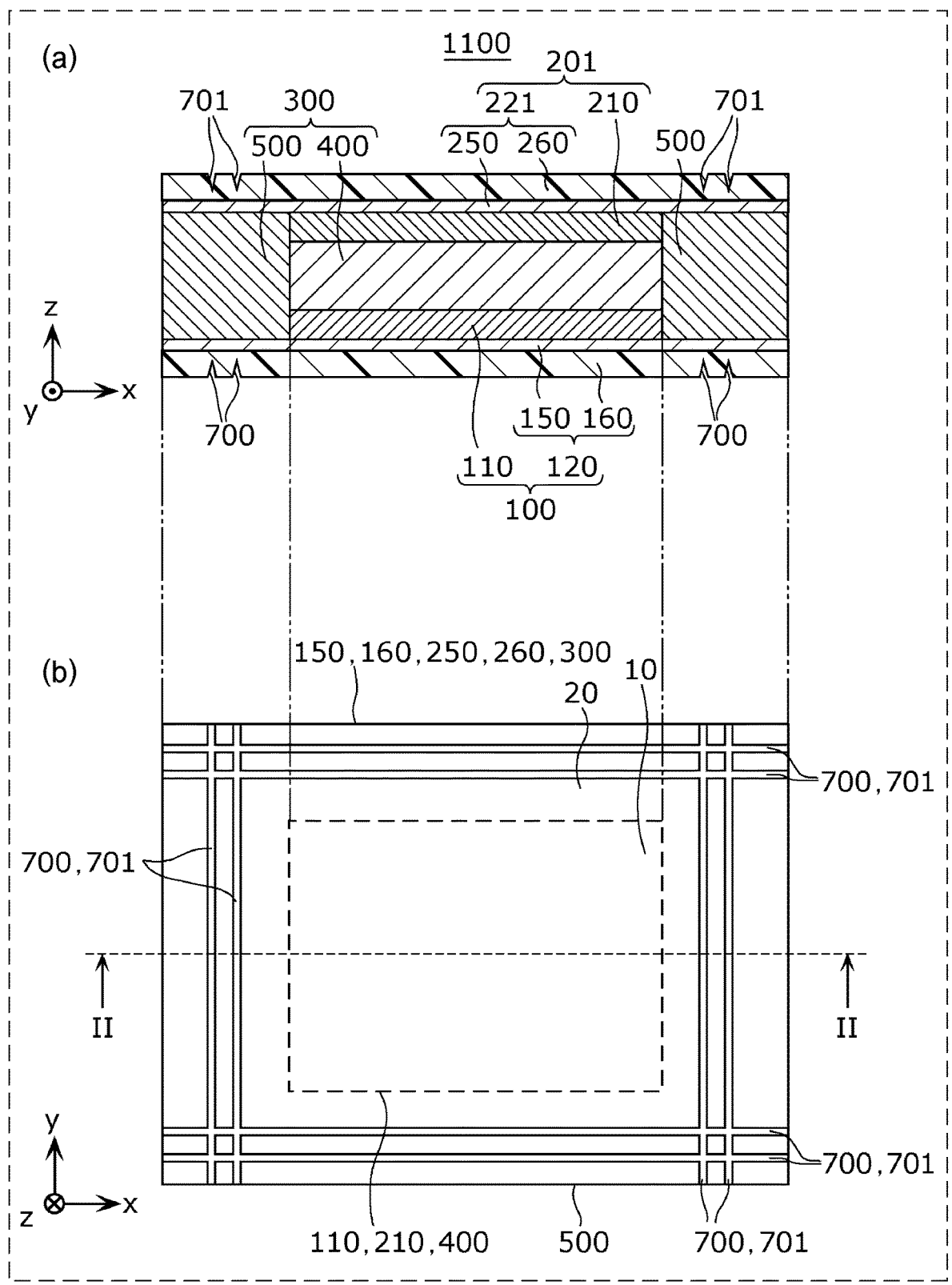
FIG. 2 illustrates diagrams showing a schematic configuration of a battery according to a Modification Example 1 of the Embodiment 1.

FIG. 2 illustrates diagrams showing a schematic configuration of a battery according to a Modification Example 1 of the Embodiment 1. Specifically, FIG. 2(a) is a cross-sectional view of a battery 1100 according to the present modification example, and FIG. 2(b) is a plan view of the battery 1100 viewed from the z-axis direction lower side. FIG. 2(a) shows a cross section at the position indicated by the II-II line in FIG. 2(b).

As shown in FIG. 2, the battery 1100 according to the Modification Example 1 of the Embodiment 1 is different from the battery 1000 in the Embodiment 1 in that a counter electrode current collector 221 is provided instead of the counter electrode current collector 220 and that the counter electrode current collector 221 is also provided with a structural defect portion 701. The counter electrode current collector 221 includes a substrate 260 provided with a structural defect portion 701.

The battery 1100 includes an electrode layer 100, a counter electrode layer 201 disposed to face and be parallel to the electrode layer 100, and a solid electrolyte layer 300 located between the electrode layer 100 and the counter electrode layer 201. The counter electrode layer 201 includes a counter electrode active material layer 210 and a counter electrode current collector 221. The counter electrode current collector 221 includes a counter electrode current collector layer 250 in contact with the counter electrode active material layer 210 and a substrate 260 in contact with a surface of the counter electrode current collector layer 250 opposite to the surface facing the counter electrode active material layer 210. That is, the battery 1100 has a structure in which a substrate 160, an electrode current collector layer 150, an electrode active material layer 110, a solid electrolyte layer 300, a counter electrode active material layer 210, a counter electrode current collector layer 250, and a substrate 260 are stacked in this order.

The top surface of the counter electrode active material layer 210 is in contact with the counter electrode current collector layer 250 of the counter electrode current collector 221, and the bottom surface of the counter electrode active material layer 210 is in contact with the solid electrolyte layer 300.

The counter electrode current collector 221 is constituted of the counter electrode current collector layer 250 having conductivity and the substrate 260 supporting the counter electrode current collector layer 250. The electrode current collector 120 includes a line-shaped structural defect portion 701 in a second region 20. Specifically, the structural defect portion 701 is formed in the substrate 260. The structural defect portion 701 is formed at the same position as that of the structural defect portion 700 in plan view.

Incidentally, details of the counter electrode current collector 221, such as the material of the substrate 260, the joining between the substrate 260 and the counter electrode current collector layer 250, and the structural defect portion 701, are the same as the explanation for the electrode current collector layer 150 and the substrate 160 of the electrode current collector 120 in the Embodiment 1, and the explanation thereof is omitted.

As described above, in the battery 1100, the electrode current collector 120 includes the substrate 160, and the counter electrode current collector 221 includes the substrate 260. Consequently, since the top and bottom surfaces of the battery 1100 are protected by the substrate 160 and the substrate 260, the reliability of the battery 1100 is more enhanced. In addition, since the structural defect portion 701 is also formed in the substrate 260, even when an external stress is applied to the battery 1100 from the counter electrode current collector 211 side, the battery 1100 is likely to be bent selectively at the second region 20 located in the outside of the electrode active material layer 110 and the counter electrode active material layer 210. Consequently, the external stress is unlikely to affect the electrode active material layer 110 and the counter electrode active material layer 210, and the electrode active material layer 110 and the counter electrode active material layer 210 are prevented from being damaged. As a result, short circuit and burnout of the battery 1100 due to contact between the electrode active material layer 110 and the counter electrode active material layer 210 are prevented. Accordingly, the reliability of the battery 1100 is improved.

MODIFICATION EXAMPLE 2

A Modification Example 2 of the Embodiment 1 will now be described. Incidentally, in the description of the following Modification Example 2, differences from the Embodiment 1 and the Modification Example 1 of the Embodiment 1 are mainly explained, and the explanation of common points is omitted or simplified.

Figure 3:
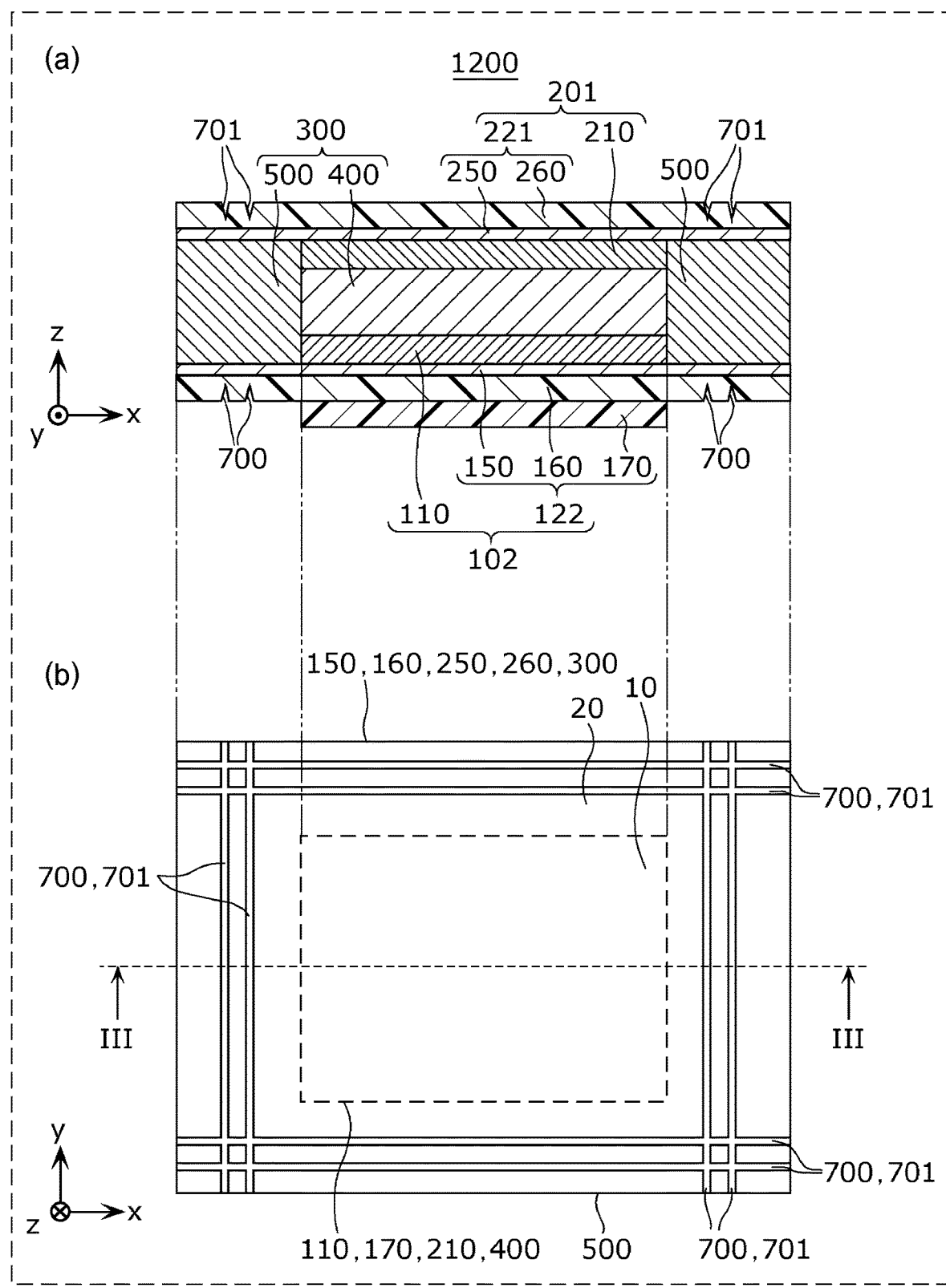
FIG. 3 illustrates diagrams showing a schematic configuration of a battery according to a Modification Example 2 of the Embodiment 1.

FIG. 3 illustrates diagrams showing a schematic configuration of a battery according to a Modification Example 2 of the Embodiment 1. Specifically, FIG. 3(a) is a cross-sectional view of a battery 1200 according to the present modification example, and FIG. 3(b) is a plan view of the battery 1200 viewed from the z-axis direction lower side. FIG. 3(a) shows a cross section at the position indicated by the line in FIG. 3(b).

As shown in FIG. 3, the battery 1200 according to the Modification Example 2 of the Embodiment 1 is different from the battery 1100 in the Modification Example 1 of the Embodiment 1 in that an electrode current collector 122 is provided instead of the electrode current collector 120 and that the electrode current collector 122 includes an auxiliary substrate 170. That is, the substrate in the first region 10 has a large thickness.

The battery 1200 includes an electrode layer 102, a counter electrode layer 201 disposed to face and be parallel to the electrode layer 102, and a solid electrolyte layer 300 located between the electrode layer 102 and the counter electrode layer 201.

The electrode layer 102 includes an electrode active material layer 110 and an electrode current collector 122. The electrode current collector 122 includes an electrode current collector layer 150 in contact with the electrode active material layer 110, a substrate 160 in contact with a surface of the electrode current collector layer 150 opposite to the surface facing the electrode active material layer 110, and an auxiliary substrate 170 located in the first region 10 and is in contact with a surface of the substrate 160 opposite to the surface facing the electrode current collector layer 150. That is, the battery 1200 has a structure in which an auxiliary substrate 170, a substrate 160, an electrode current collector layer 150, an electrode active material layer 110, a solid electrolyte layer 300, a counter electrode active material layer 210, a counter electrode current collector layer 250, and a substrate 260 are stacked in this order.

The auxiliary substrate 170 is joined to the bottom surface of the substrate 160 in the first region 10. The auxiliary substrate 170 does not have a structural defect portion. The auxiliary substrate 170 has a rectangular shape in plan view. The auxiliary substrate 170 is located at the same position as those of the electrode active material layer 110 and the counter electrode active material layer 210 in plan view. The structural defect portion 700 and the structural defect portion 701 are located in the outside of the auxiliary substrate 170 in plan view. Incidentally, the auxiliary substrate 170 may be located so as to extend the outside of the first region 10 as long as the structural defect portion 700 is formed outside the auxiliary substrate 170 in plan view.

Consequently, the electrode active material layer 110 and the counter electrode active material layer 210 located in the first region 10 are more certainly protected, and the battery 1200 is likely to be bent more selectively at the structural defect portion 700 or 701 located in the second region 20.

The auxiliary substrate 170 and the substrate 160 may be joined to each other with, for example, an adhesive or may be provided with irregularities at the interface between both so as to engage with each other and prevent misalignment. Alternatively, the auxiliary substrate 170 and the substrate 160 may be integrally formed.

Regarding the material of the auxiliary substrate 170, the description thereof is the same as that of the substrate 160 in the Embodiment 1 and is therefore omitted.

With such a configuration, a stress is concentrated in corner positions having different thicknesses, and the step line is likely to be damaged. As a result, the power generation element region, which is a region including the electrode active material layer 110, the counter electrode active material layer 210, and the first solid electrolyte layer 400, is protected against a stress to the battery 1200 from the outside,

MODIFICATION EXAMPLE 3

A Modification Example 3 of the Embodiment 1 will now be described. Incidentally, in the description of the following Modification Example 3, differences from the Embodiment 1 and each modification example of the Embodiment 1 are mainly explained, and the explanation of common points is omitted or simplified.

Figure 4:
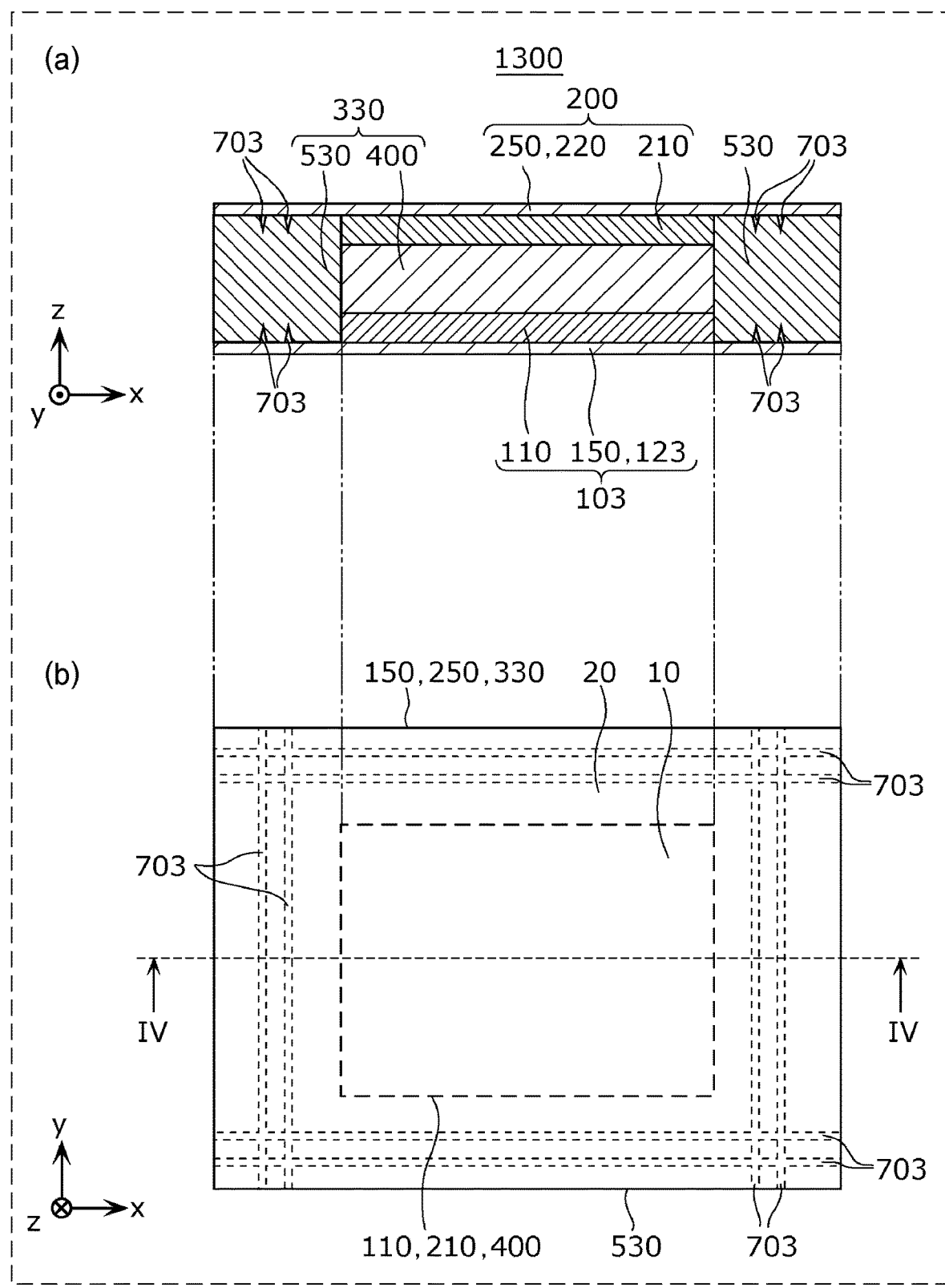
FIG. 4 illustrates diagrams showing a schematic configuration of a battery according to a Modification Example 3 of the Embodiment 1.

FIG. 4 illustrates diagrams showing a schematic configuration of a battery according to a Modification Example 3 of the Embodiment 1. Specifically, FIG. 4(a) is a cross-sectional view of a battery 1300 according to the present modification example, and FIG. 4(b) is a plan view of the battery 1300 viewed from the z-axis direction lower side. FIG. 4(a) shows a cross section at the position indicated by the IV-IV line in FIG. 4(b).

As shown in FIG. 4, the battery 1300 according to the Modification Example 3 of the Embodiment 1 is different from the battery 1000 in the Embodiment 1 in that an electrode current collector 123 not including a substrate is provided instead of the electrode current collector 120 and that a second solid electrolyte layer 530 provided with a structural defect portion 703 is provided instead of the second solid electrolyte layer 500.

The battery 1300 includes an electrode layer 103, a counter electrode layer 200 disposed to face and be parallel to the electrode layer 103, and a solid electrolyte layer 330 located between the electrode layer 103 and the counter electrode layer 200.

The electrode layer 103 includes an electrode active material layer 110 and an electrode current collector 123. The electrode current collector 123 includes an electrode current collector layer 150 in contact with the electrode active material layer 110. The electrode current collector 123 does not include a substrate and is constituted of an electrode current collector layer 150. That is, the battery 1300 has a structure in which an electrode current collector layer 150, an electrode active material layer 110, a solid electrolyte layer 330, a counter electrode active material layer 210, and a counter electrode current collector layer 250 are stacked in this order.

The solid electrolyte layer 330 covers the outside of the electrode active material layer 110 and the counter electrode active material layer 210 in plan view and is in contact with the electrode current collector 123 and the counter electrode current collector 220 in the second region 20. The solid electrolyte layer 330 includes a line-shaped structural defect portion 703. Specifically, the solid electrolyte layer 330 includes a first solid electrolyte layer 400 located in the first region 10 and a second solid electrolyte layer 530 located in the second region 20, and the structural defect portion 703 is formed in the second solid electrolyte layer 530.

The second solid electrolyte layer 530 covers the outside of the electrode active material layer 110 and the counter electrode active material layer 210 in plan view and is in contact with the electrode current collector 123 and the counter electrode current collector 220 in the second region 20. The second solid electrolyte layer 530 includes the line-shaped structural defect portion 703 in the second region 20.

Regarding the structural defect portion 703, a plurality of the structural defect portions 703 is formed on the surfaces of the second solid electrolyte layer 530 facing the electrode current collector 123 (i.e., the electrode current collector layer 150) and the counter electrode current collector 220 (i.e., the counter electrode current collector layer 250). In other words, each of the structural defect portions 703 is formed in contact with the interface between the second solid electrolyte layer 530 and the electrode current collector layer 150 and the interface between the second solid electrolyte layer 530 and the counter electrode current collector layer 250. The structural defect portion 703 on the electrode current collector 123 side and the structural defect portion 703 on the counter electrode current collector 220 side in the second solid electrolyte layer 530 are formed at the same position in plan view. The structural defect portion 703 is not limited to the line-shaped groove and may be, for example, a plurality of holes arranged in a line shape or a slit in a line shape, as in the structural defect portion 700 of the Embodiment 1. The structural defect portion 703 is a portion where discontinuous parts of the material constituting the second solid electrolyte layer 530 are arranged in a row. Consequently, even if the electrode current collector 123 does not include the substrate 160 in the Embodiment 1, the battery 1300 is likely to be bent selectively at the structural defect portion 703 located in the second region 20 when a stress is applied to the battery 1300 from the outside. Accordingly, the electrode active material layer 110 and the counter electrode active material layer 210 located in the first region 10 are protected. As a result, short circuit due to contact between the electrode active material layer 110 and the counter electrode active material layer 210 is prevented.

Incidentally, in the battery 1300, a groove, holes, or a slit may be formed as the structural defect portion 703 in the inside of the second solid electrolyte layer 530.

The structural defect portion 703 is formed such that the bending resistance strength of the battery 1300 in the second region 20 is lower than the bending resistance strength of the battery 1300 in the first region 10.

The structural defect portion 703 is formed by, for example, forming a groove in a printing coated solid electrolyte film from the surface thereof with a Thomson blade or the like. Alternatively, the structural defect portion 703 may be formed in advance by applying a stress selectively to the second solid electrolyte layer 530 located in the second region 20 to form a structural defect and increasing the structural defect density to a level higher than that of the first solid electrolyte layer 400 located in the first region 10. Consequently, the structural defect portion 703 is formed such that the bending resistance strength of the battery 1300 in the second region 20 is lower than that of the battery 1300 in the first region 10. The structural defect is, for example, a groove-like crack, layered delamination, or a void. For example, the crack and delamination are also formed by printing coating the solid electrolyte and then drying selectively the second region 20 rapidly and at high temperature than the first region 10, applying bending during a drying process, or applying a pressure with an uneven mold or rubber. Thus, the bending resistance strength of the structural defect portion 703 may be controlled by controlling the shape of the structural defect.

In addition, the current collector layer may also be provided with holes, a groove, or a slit in the second region 20. In the second region 20, structural defects, such as peeling off or a joining defect, may be formed at the interface between the current collector layer and the second solid electrolyte layer 530. In such a configuration, the power generation element region, which is a region including the electrode active material layer 110, the counter electrode active material layer 210, and the first solid electrolyte layer 400, is protected against a stress to the battery 1300 from the outside.

MODIFICATION EXAMPLE 4

A Modification Example 4 of the Embodiment 1 will now be described. Incidentally, in the description of the following Modification Example 4, differences from the Embodiment 1 and each modification example of the Embodiment 1 are mainly explained, and the explanation of common points is omitted or simplified.

Figure 5:
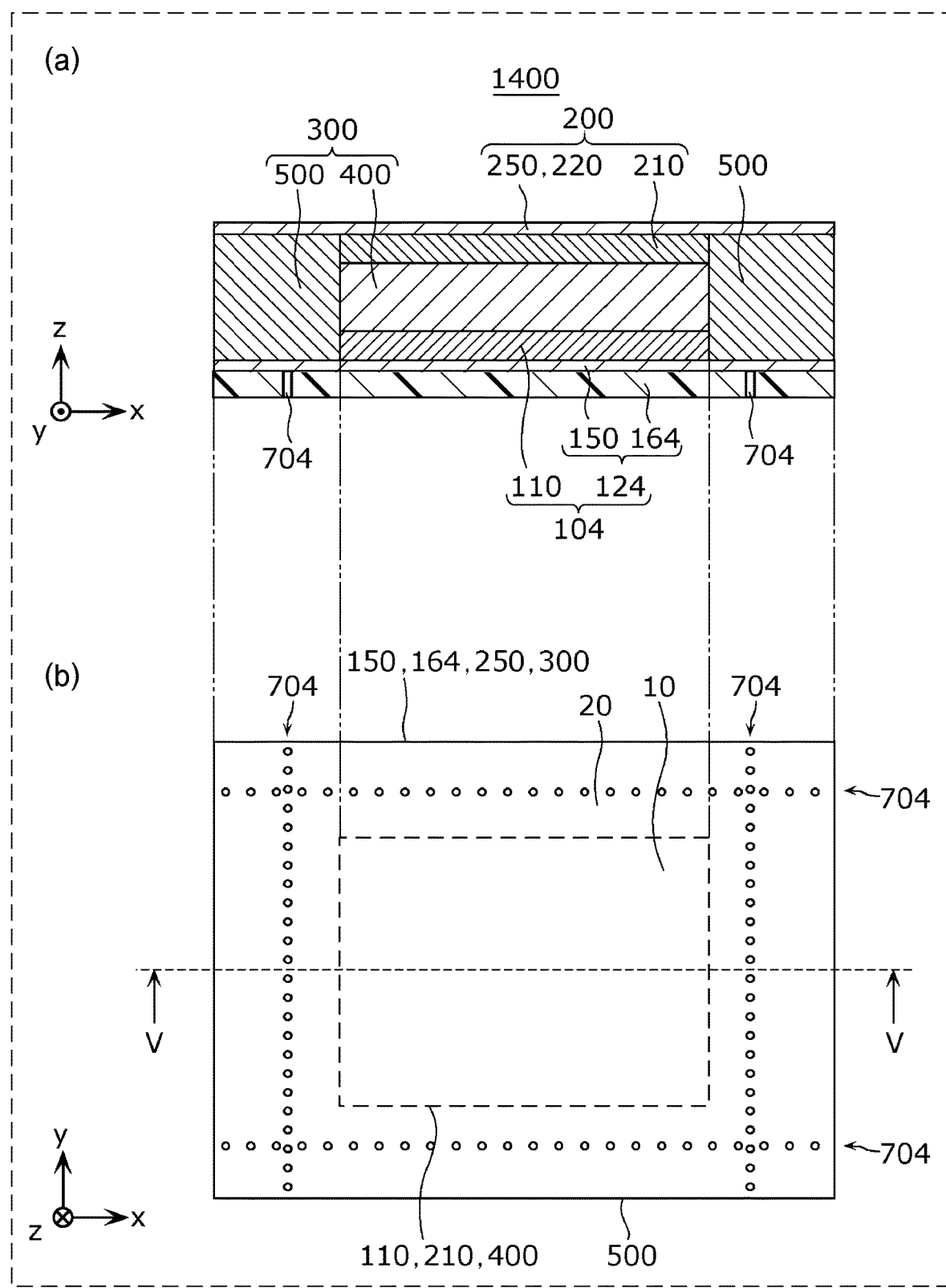
FIG. 5 illustrates diagrams showing a schematic configuration of a battery according to a Modification Example 4 of the Embodiment 1.

FIG. 5 illustrates diagrams showing a schematic configuration of a battery according to a Modification Example 4 of the Embodiment 1. Specifically, FIG. 5(a) is a cross-sectional view of a battery 1400 according to the present modification example, and FIG. 5(b) is a plan view of the battery 1400 viewed from the z-axis direction lower side. FIG. 5(a) shows a cross section at the position indicated by the V-V line in FIG. 5(b).

As shown in FIG. 5, the battery 1400 according to the Modification Example 4 of the Embodiment 1 is different from the battery 1000 in the Embodiment 1 in that an electrode current collector 124 is provided instead of the electrode current collector 120. The electrode current collector 124 includes a substrate 164 including a structural defect portion 704, instead of the substrate 160.

The battery 1400 includes an electrode layer 104, a counter electrode layer 200 disposed to face and be parallel to the electrode layer 104, and a solid electrolyte layer 300 located between the electrode layer 104 and the counter electrode layer 200.

The electrode layer 104 includes an electrode active material layer 110 and an electrode current collector 124. The electrode current collector 124 includes an electrode current collector layer 150 in contact with the electrode active material layer 110 and a substrate 164 in contact with a surface of the electrode current collector layer 150 opposite to the surface facing the electrode active material layer 110.

The substrate 164 includes a structural defect portion 704 constituted of a plurality of holes arranged in a line shape in the second region 20. Incidentally, details of the material of the substrate 164, the joining between the substrate 164 and the electrode current collector layer 150, etc. are the same as the explanation for the substrate 160 in the Embodiment 1, and the description thereof is omitted.

The structural defect portion 704 is composed of a plurality of holes arranged in a line shape in the second region 20 of the substrate 164. The holes constituting the structural defect portion 704 are, for example, through holes passing through the substrate 164 from the top surface to the bottom surface as shown in FIG. 5. The holes constituting the structural defect portion 704 may be in a bottomed hole shape not passing through. The shape of the holes constituting the structural defect portion 704 is, for example, circular in plan view as shown in FIG. 5(*b*). Plan view shape of the holes constituting the structural defect portion 704 may be, for example, a rectangular, square, polygonal, star-like, or cross-like shape. The plurality of holes may have a broken line shape in which short lines are aligned in plan view. Alternatively, the plurality of holes may be arranged evenly in a line shape in the substrate 164 or may be arranged unevenly. The strength, shape, direction, etc. when the substrate 164 is damaged at the structural defect portion 704 can be easily adjusted by, for example, the shape, depth, and number of the plurality of holes.

Examples of the method for forming the structural defect portion 704 include a method using a laser or a drill.

As described above, since the structural defect portion 704 is formed in the substrate 164, even if an external stress is applied to the battery 1400, the battery 1400 is likely to be bent or damaged selectively at the second region 20 located in the outside of the electrode active material layer 110 and the counter electrode active material layer 210. Accordingly, as in the battery 1000 according to the Embodiment 1, short circuit and burnout of the battery 1400 are prevented. Accordingly, the reliability of the battery 1400 is improved. In addition, since the structural defect portion 704 is constituted of a plurality of holes, for example, when an adhesive, such as conductive paste or solder, is used at the joint of the substrate 164 and the electrode current collector layer 150, the adhesive penetrates into the plurality of holes and also joins the inner surface of the substrate 164 surrounding the plurality of holes and the electrode current collector layer 150 to strengthen the joining. Accordingly, the substrate 164 and the electrode current collector layer 150 are prevented from peeling off, and the reliability of the battery 1400 is more improved.

MODIFICATION EXAMPLE 5

A Modification Example 5 of the Embodiment 1 will now be described. Incidentally, in the description of the following Modification Example 5, differences from the Embodiment 1 and each modification example of the Embodiment 1 are mainly explained, and the explanation of common points is omitted or simplified.

Figure 6:
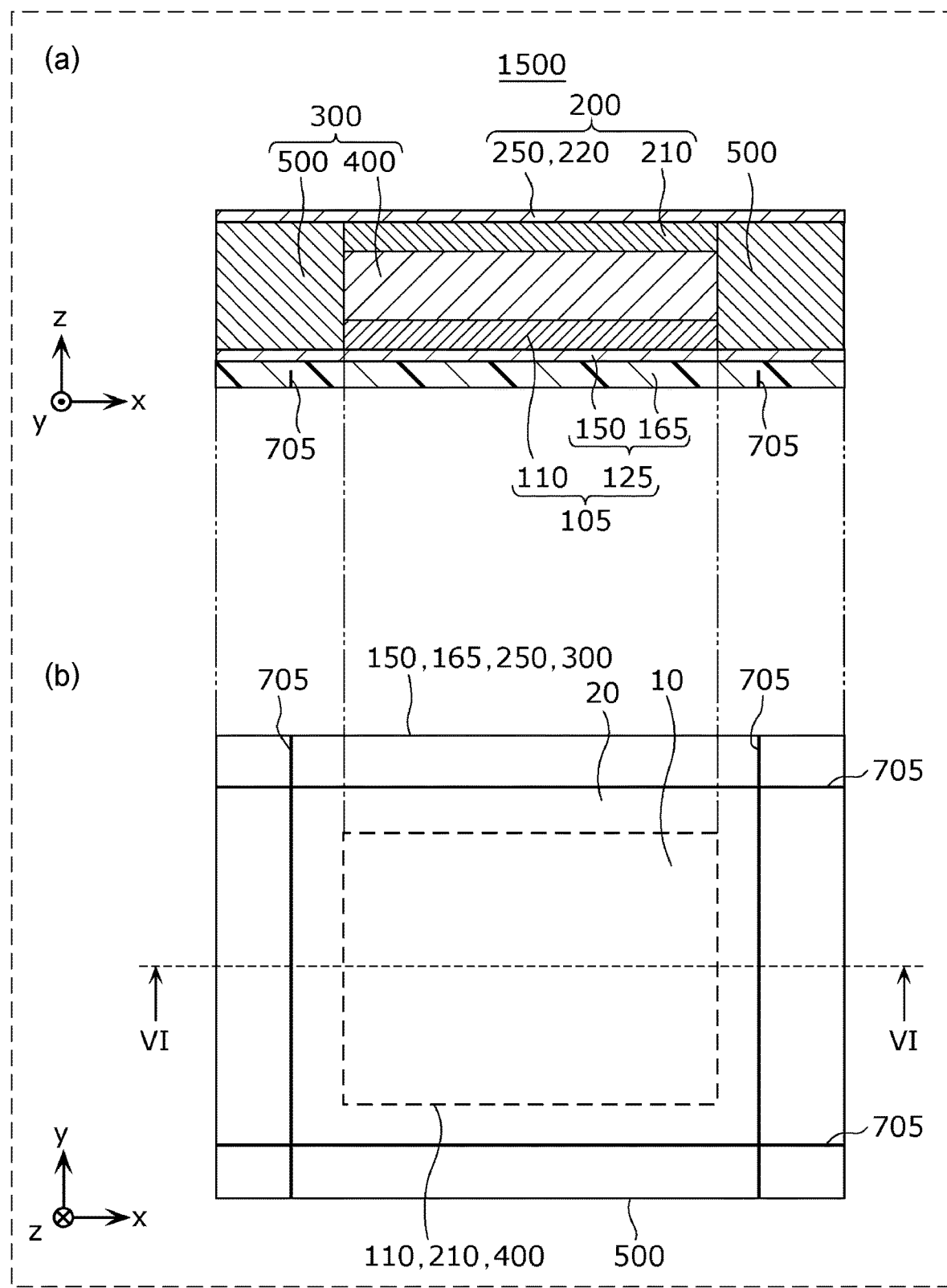
FIG. 6 illustrates diagrams showing a schematic configuration of a battery according to a Modification Example 5 of the Embodiment 1.

FIG. 6 illustrates diagrams showing a schematic configuration of a battery according to a Modification Example 5 of the Embodiment 1. Specifically, FIG. 6(*a*) is a cross-sectional view of a battery 1500 according to the present modification example, and FIG. 6(*b*) is a plan view of the battery 1500 viewed from the z-axis direction lower side. FIG. 6(*a*) shows a cross section at the position indicated by the VI-VI line in FIG. 6(*b*).

As shown in FIG. 6, the battery 1500 according to the Modification Example 5 of the Embodiment 1 is different from the battery 1000 in the Embodiment 1 in that an electrode current collector 125 is provided instead of the electrode current collector 120. The electrode current collector 125 includes a substrate 165 including a structural defect portion 705, instead of the substrate 160.

The battery 1500 includes an electrode layer 105, a counter electrode layer 200 disposed to face and be parallel to the electrode layer 105, and a solid electrolyte layer 300 located between the electrode layer 105 and the counter electrode layer 200.

The electrode layer 105 includes an electrode active material layer 110 and an electrode current collector 125. The electrode current collector 125 includes an electrode current collector layer 150 in contact with the electrode active material layer 110 and a substrate 165 in contact with a surface of the electrode current collector layer 150 opposite to the surface facing the electrode active material layer 110.

The substrate 165 includes a structural defect portion 705 in the second region 20. Incidentally, details of the material of the substrate 165, the joining between the substrate 165 and the electrode current collector layer 150, etc. are the same as the explanation for the substrate 160 in the Embodiment 1, and the description thereof is omitted.

The structural defect portion 705 is a slit in a line shape formed in the substrate 165 in the second region 20. The structural defect portion 705 is formed on a surface of the substrate 165 opposite to the surface facing the electrode current collector layer 150. The slit of the structural defect portion 705 does not reach the surface of the substrate 165 facing the electrode current collector layer 150. In the slit, a space that is a concave formed on the surface of the substrate 165 is not formed.

Examples of the method for forming the structural defect portion 705 include a method using a dicing cutter or a diamond cutter. Alternatively, the structural defect portion 705 may be formed in advance by applying a stress selectively to the substrate 165 in the second region 20. Since the structural defect portion 705 is a slit, there is no need to carve out the material of the substrate 165, and the structural defect portion 705 can be easily formed.

As described above, since the structural defect portion 705 is formed in the substrate 165, even if an external stress is applied to the battery 1500, the battery 1500 is likely to be bent or fractionated selectively in the second region 20 located in the outside of the electrode active material layer 110 and the counter electrode active material layer 210. Accordingly, short circuit and burnout of the battery 1500 are prevented as in the battery 1000 according to the Embodiment 1. Accordingly, the reliability of the battery 1500 is improved.

OTHER MODIFICATION EXAMPLE

Other modification examples according to the Embodiment 1 will now be described.

FIGS. 7A to 7H illustrate cross-sectional views showing examples of the structural defect portions according to other modification examples of the Embodiment 1. In FIGS. 7A to 7H, only the substrate, electrode current collector layer, and second solid electrolyte layer in a periphery of the structural detection portion of each battery are shown, and other portions are omitted.

Figure 7A:
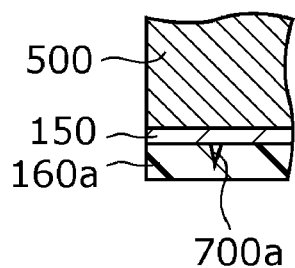
FIGS. 7A to 7H illustrate cross-sectional views showing examples of the structural defect portions according to other modification examples of the Embodiment 1.

For example, as shown in FIG. 7A, the structural defect portion 700*a* is a groove having a V-shaped cross section formed in a line shape in a surface of the substrate 160*a* facing the electrode current collector layer 150.

Figure 7B:
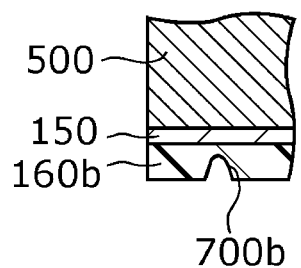

For example, as shown in FIG. 7B, the structural defect portion 700*b* is a groove with a U-shape formed in a line shape in a substrate 160*b*.

Figure 7C:
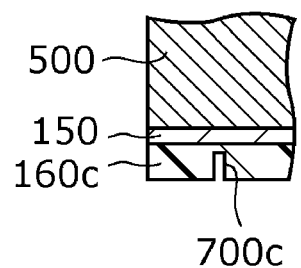

For example, as shown in FIG. 7C, the structural defect portion 700*c* is a groove with a concave shape (a squared U shape) formed in a line shape in the substrate 160*c*.

Figure 7D:
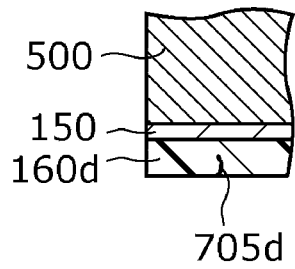

For example, as shown in FIG. 7D, the structural defect portion 705*d* is a linear slit with a bent cross section formed in a line shape in the substrate 160*d*.

Figure 7E:
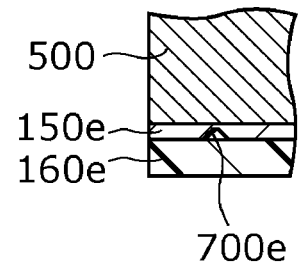

For example, as shown in FIG. 7E, the structural defect portion 700*e* is a groove having a V-shaped cross section formed in a line shape on the surface of the electrode current collector layer 150*e* facing the substrate 160*e*.

Figure 7F:
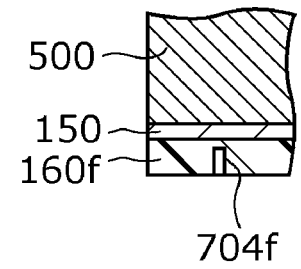

For example, as shown in FIG. 7F, the structural defect portion 704f is composed of a plurality of bottomed holes arranged in a line shape formed in a surface of the substrate 160f opposite to the surface facing the electrode current collector layer 150.

Figure 7G:
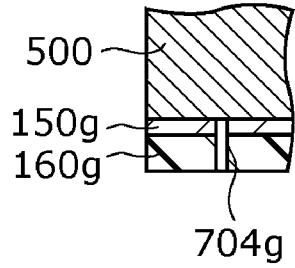

For example, as shown in FIG. 7G, the structural defect portion 704g is composed of a plurality of holes arranged in a line shape formed so as to pass through both the substrate 160g and the electrode current collector layer 150g.

Figure 7H:
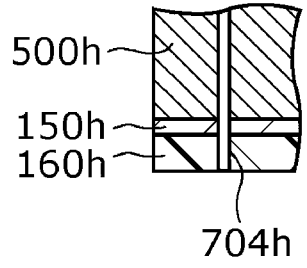

For example, as shown in FIG. 7H, the structural defect portion 704h is composed of a plurality of holes arranged in a line shape formed so as to pass through all of the substrate 160h, the electrode current collector layer 150h, and the second solid electrolyte layer 500h. Incidentally, although it is not shown in FIG. 7H, the structural defect portion 704h may be formed so as to further pass through a counter electrode current collector 220.

Method for Manufacturing Battery

Next, an example of a method for manufacturing a battery according to the present embodiment will be described. Hereinafter, a method for manufacturing the battery 1100 according to the Modification Example 1 of the above-described embodiment will be described. The methods for other batteries 1000, 1200, 1300, 1400, and 1500 are the same.

In the following description, a case in which the electrode active material layer 110 is a positive electrode active material layer, the electrode current collector layer 150 is a positive electrode current collector layer, the counter electrode active material layer 210 is a negative electrode active material layer, and the counter electrode current collector layer 250 is a negative electrode current collector layer will be described. Accordingly, the electrode current collector 120 is a positive electrode current collector, the counter electrode current collector 220 is a negative electrode current collector, the electrode layer 100 is a positive electrode layer, and the counter electrode layer 200 is a negative electrode layer.

First, respective pastes to be used for printing formation of a positive electrode active material layer and a negative electrode active material layer are produced. As a solid electrolyte raw material to be used in the mixtures for the positive electrode active material layer and the negative electrode active material layer, for example, a glass powder of an $Li_2S$—$P_2S_5$-based sulfide having a main component of a triclinic system crystal and having an average particle diameter of about 10 μm is prepared. As this glass powder, a powder having a high ionic conductivity (e.g., 2 to $3 \times 10^{-3}$ S/cm) can be used. As the positive electrode active material, for example, a powder of an Li·Ni·Co·Al complex oxide ($LiNi_{0.8}Co_{0.15}Al_{0.05}O_2$) having a layered structure and having an average particle diameter of about 5 μm is used. A mixture containing the above-described positive electrode active material and the above-described glass powder is dispersed in, for example, an organic solvent to produce a paste for a positive electrode active material layer. As the negative electrode active material, for example, a powder of natural graphite having an average particle diameter of about 10 μm is used. A mixture containing the above-described negative electrode active material and the above-described glass powder is dispersed in, for example, an organic solvent to produce a paste for a negative electrode active material layer as in above.

Then, as the material to be used for a positive electrode current collector layer and a negative electrode current collector layer, for example, copper foil having a thickness of about 30 μm is prepared. The paste for a positive electrode active material layer and the paste for a negative electrode active material layer are printed by a screen printing method on one surface and the other surface of the copper foil, respectively, with a predetermined shape and a thickness of about 50 to 100 μm. On this occasion, the paste for a positive electrode active material layer and the paste for a negative electrode active material layer are each printed such that the areas are smaller than that of the current collector layer in plan view. The paste for a positive electrode active material layer and the paste for a negative electrode active material layer are dried at 80° C. to 130° C. to give a thickness of 30 to 60 μm. Consequently, a current collector (copper foil) provided with a positive electrode active material layer and a negative electrode active material layer is obtained.

Then, a mixture containing the above-described glass powder is dispersed in, for example, an organic solvent to produce a paste for a solid electrolyte layer. The paste for a solid electrolyte layer is printed at a thickness of, for example, about 100 μm on each of the active material layers formed on the positive electrode current collector layer and the negative electrode current collector layer using a metal mask. On this occasion, the paste for a solid electrolyte layer is printed not only on the active material layer but also on the current collector layer. Consequently, as the solid electrolyte layer 300, a first solid electrolyte layer 400 and a second solid electrolyte layer 500 are formed. Subsequently, the positive electrode current collector layer on which a positive electrode active material layer is formed and the negative electrode current collector layer on which a negative electrode active material layer is formed, wherein a paste for a solid electrolyte layer is printed on each of both the layers, are dried at 80° C. to 130° C.

Then, the solid electrolyte printed on the positive electrode active material layer formed on the positive electrode current collector layer and the solid electrolyte printed on the negative electrode active material layer formed on the negative electrode current collector layer are stacked so as to be in contact with and face each other, and the stacked layered product is put in a die with a rectangular outer shape.

Then, an elastic body sheet having a thickness of about 70 μm and an elastic modulus of about $5 \times 10^6$ Pa is inserted between a pressurizing mold punch and the layered product. In this configuration, a pressure is applied to the layered product via the elastic body sheet. Thereafter, a pressure of 300 MPa is applied to the pressurizing mold for 90 seconds while warming the mold to 50° C. to obtain a layered product composed of the positive electrode current collector layer, the positive electrode active material layer, the solid electrolyte layer 300, the negative electrode active material layer, and the negative electrode current collector layer.

Then, substrates 160 and 260 each including alumina, having a thickness of 100 μm, and coated with gold by vacuum deposition (alumina substrate of which the front and back are each a nickel base (2 μm) plated with gold (2 μm)) are prepared. Then, a groove with a V-shaped cross section having a depth of about 30 μm and a width of 10 μm on the surface side is formed in a line shape with a diamond cutter in the region to be formed into the second region 20. Consequently, a structural defect portion 700 is formed in the substrate 160, and a structural defect portion 701 is formed in the substrate 260. Then, a thermosetting conductive paste containing silver particles is screen printed with a thickness of about 10 μm on a surface of each of the substrates 160 and 260 opposite to the surface provided with the groove. Then, the layered product is placed between the substrate 160 and the substrate 260 such that the conductive pastes printed on the substrates 160 and 260 are in contact with the layered product and is disposed at a predetermined position, and the substrates 160 and 260 and the layered product are pressure-bonded. After this, thermosetting treatment is performed at about 100° C. to 300° C. for 60 minutes in the air such that the substrates 160 and 260 and the layered product are prevented from moving, followed by cooling to room temperature. By doing so, a battery 1100 is obtained.

Incidentally, the method and order for manufacturing a battery are not limited to the above.

Incidentally, the above-described manufacturing method is an example in which the paste for a positive electrode active material layer, the paste for a negative electrode active material layer, the paste for a solid electrolyte layer, and the conductive paste are applied by printing, but the method is not limited thereto. As the printing method, for example, a doctor blade method, a calender method, a spin coating method, a dip coating method, an inkjet method, an offset method, a die coating method, or a spray method may be used.

In the above-described manufacturing method, as an example of the conductive paste, a thermosetting conductive paste containing metal particles of silver is shown, but the conductive paste is not limited thereto. As the conductive paste, a thermosetting conductive paste containing highly conductive metal particles having a high melting point (e.g., 400° C. or higher), metal particles having a low melting point (which may be equal to or lower than the curing temperature of the conductive paste, for example, 300° C. or lower), and a resin is used. Examples of the material of the highly conductive metal particles having a high melting point include silver, copper, nickel, zinc, aluminum, palladium, gold, platinum, and alloys of combinations of these metals. Examples of the material of the metal particles having a low melting point of 300° C. or less include tin, a tin-zinc alloy, a tin-silver alloy, a tin-copper alloy, a tin-aluminum alloy, a tin-lead alloy, indium, an indium-silver alloy, an indium-zinc alloy, an indium-tin alloy, bismuth, a bismuth-silver alloy, a bismuth-nickel alloy, a bismuth-tin alloy, a bismuth-zinc alloy, and a bismuth-lead alloy. By using a conductive paste containing such metal particles having a low melting point, even at a thermosetting temperature lower than the melting point of the higher conductive metal particles having a high melting point, a solid-liquid phase reaction proceeds at the contact portion between the metal particles in the conductive paste and the metal constituting the current collector layer and/or the conductor on the surface of the substrate 160 or 260. Consequently, at the interface between the conductive paste and the surface of the current collector layer and/or the substrate 160 or 260, the diffusion region alloyed by the solid-liquid phase reaction is formed in a periphery of the contact portion. Examples of the alloy to be formed when a silver or an silver alloy is used for the conductive metal particle and copper is used for the current collector layer include a silver-copper based alloy that is a highly conductive alloy. Furthermore, for example, a silver-nickel alloy or a silver-palladium alloy can be formed by combining a conductive metal particle and a current collector layer. Since the substrate 160 or 260 and the current collector layer are more strongly joined by this configuration, peeling off of the joint by, for example, hot-cold cycles or an impact is prevented, and bending is likely to occur selectively at the structural defect portion 700 of the substrate 160 or the structural defect portion 701 of the substrate 260.

Incidentally, the highly conductive metal particles having a high melting point and the metal particles having a low melting point may have any shape, such as spherical, scaly, and needle-like shapes. The particle sizes of the highly conductive metal particles having a high melting point and the metal particles having a low melting point are not particularly limited. For example, the smaller the particle size, the more the alloy reaction and diffusion proceed at a lower temperature. Accordingly, the particle sizes and shapes are appropriately selected considering the influence of thermal history on the process design and battery characteristics.

The resin that is used in the thermosetting conductive paste may be any resin that functions as a binder and is further appropriately selected according to, for example, printing properties and application properties, the production process to be adopted. Examples of the resin that is used in the thermosetting conductive paste include a thermosetting resin. Examples of the thermosetting resin include (i) amino resins such as urea resin, melamine resin, and guanamine resin, (ii) epoxy resins of, for example, bisphenol A type, bisphenol F type, phenol novolac type, and alicyclic type, (iii) oxetane resin, (iv) phenol resins of, for example, resole type and novolak type, and (v) silicone modified organic resins, such as silicone epoxy and silicone polyester. As the resin, these materials may be used alone, or a combination of two or more of these materials may be used.

Embodiment 2

Figure 8:
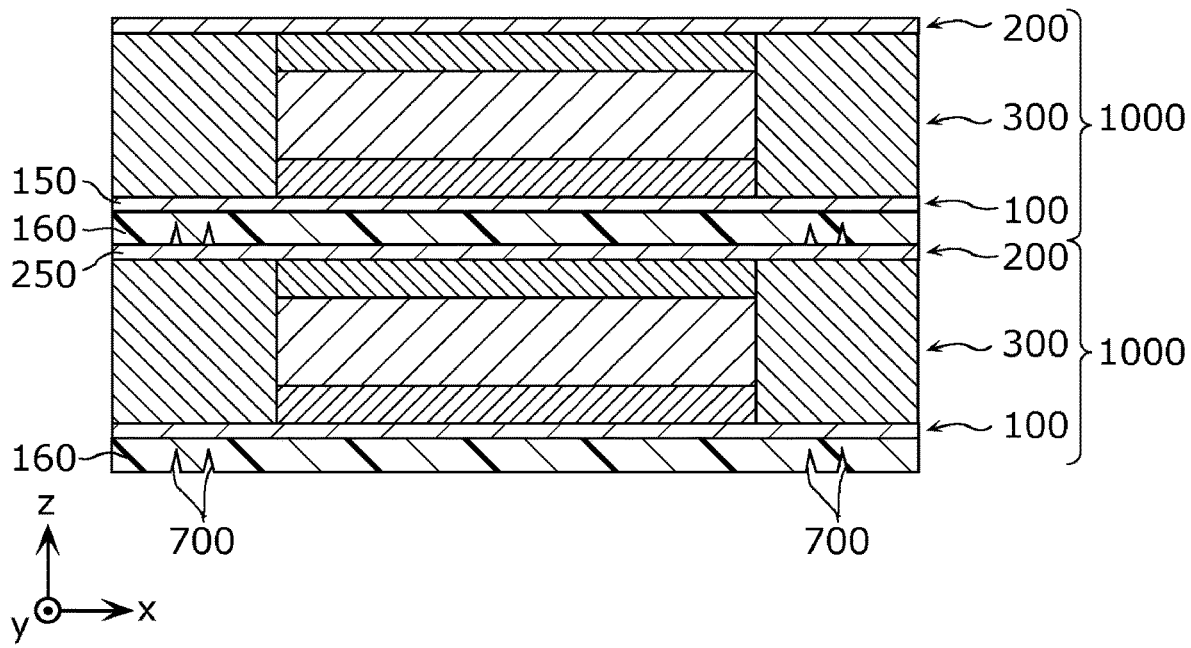
FIG. 8 is a cross-sectional view showing an example of a layered battery according to an Embodiment 2.
Figure 9:
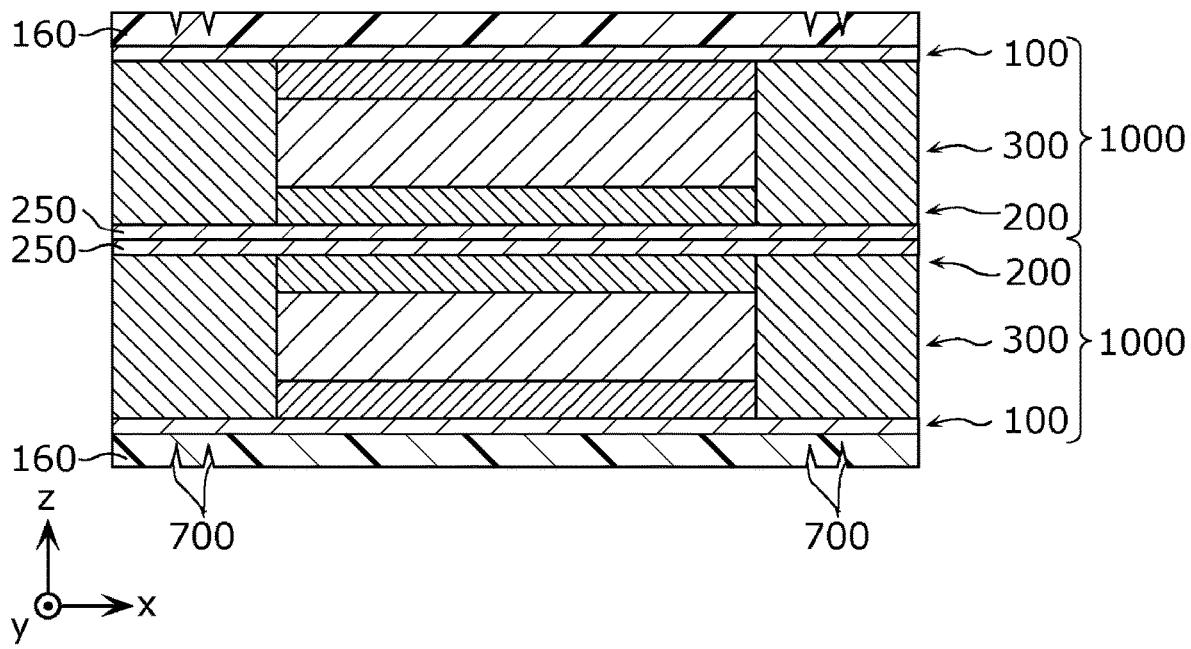
FIG. 9 is a cross-sectional view showing another example of a layered battery according to the Embodiment 2.

Hereinafter, an Embodiment 2 will be described. Incidentally, in the following description, differences from the above-described Embodiment 1 and each modification example are mainly explained, and the explanation of common points is appropriately omitted or simplified. FIGS. 8 and 9 are cross-sectional views showing examples of the schematic configuration a layered battery according to the present embodiment in which a plurality of batteries are connected.

FIG. 8 is a cross-sectional view showing a layered battery 2000 according to the Embodiment 2. The layered battery 2000 is a layered battery in which a plurality of, specifically two, batteries 1000 according to the above-described Embodiment 1 are stacked such that the electrodes are oriented in the same direction. As shown in FIG. 8, the layered battery 2000 includes two batteries 1000. In the layered battery 2000, the batteries 1000 adjoining in the stacking direction are stacked such that the electrode layer 100 of the battery 1000 on the upper side and the counter electrode layer 200 of the battery 1000 on the lower side are in contact with each other. A substrate 160 is located between the electrode current collector layer 150 of the battery 1000 on the upper side and the counter electrode current collector layer 250 of the battery 1000 on the lower side. That is, in the layered battery 2000, the batteries 1000 are stacked such that the substrate 160 of the battery 1000 on the lower side is in contact with the battery 1000 on the upper side. As described above, the substrate 160 of the battery 1000 may be allowed to function as a terminal electrode, and the batteries 1000 are electrically connected in series by conducting a current from the top surface to the bottom surface. When the substrate 160 does not have conductivity, the batteries 1000 can be electrically connected to each other by connecting the current collector layers to each other with, for example, lead wire. In such a case, the batteries 1000 may be connected in series or may be connected in parallel depending on the connection form of, for example, lead wire.

FIG. 9 is a cross-sectional view showing a layered battery 2100 according to the Embodiment 2. The layered battery 2100 is a layered battery in which a plurality of, specifically two, batteries 1000 according to the above-described Embodiment 1 are stacked such that the electrodes are oriented in the opposite directions. As shown in FIG. 9, the layered battery 2100 includes two batteries 1000. In the layered battery 2100, the batteries 1000 adjoining in the stacking direction are stacked such that the counter electrode layer 200 of the battery 1000 on the upper side and the counter electrode layer 200 of the battery 1000 on the lower side are in contact with each other. A substrate 160 is not located between the counter electrode current collector layer 250 of the battery 1000 on the upper side and the counter electrode current collector layer 250 of the battery 1000 on the lower side, and the counter electrode current collector layers 250 of the two batteries 1000 are connected to each other. When the current collector layers with the same polarity are thus connected to each other, the batteries 1000 are electrically connected in parallel. In the layered battery 2100, substrates 160 are stacked on the top portion and on the bottom portion. Since the top and bottom surfaces of the layered battery 2100 are thus protected by the substrates 160, the reliability of the layered battery 2100 is further enhanced.

Incidentally, the number of the batteries 1000 included in each of the layered batteries 2000 and 2100 may be three or more. Desired battery characteristics can be obtained by adjusting the number of batteries to be stacked. In addition, among the batteries included in each of the layered batteries 2000 and 2100, as long as at least one battery is the battery 1000, other batteries may be batteries in which the structural defect portion is not formed in a current collector or a solid electrolyte layer. In addition, in each of the layered batteries 2000 and 2100, at least one of the batteries 1100 to 1500 in the Modification Examples 1 to 5 of the Embodiment 1 may be used instead of the battery 1000.

Other Embodiment

Batteries according to the present disclosure have been described based on embodiments, but the present disclosure is not limited to these embodiments. Forms in which various modifications that can be conceived by those skilled in the art are applied to the embodiment and other forms constructed by combining some components in the embodiment are also encompassed in the present disclosure as long as they do not deviate from the gist of the present disclosure.

For example, in the embodiments above, the electrode active material layer and the counter electrode active material layer are at the same position in plan view, and the position of the electrode active material layer in plan view is in the first region, but the configuration is not limited thereto. When the electrode active material layer and the counter electrode active material layer do not completely overlap, the region in which the electrode active material layer is located in plan view may be denoted as the first region. Alternatively, the region in which the electrode active material layer and the counter electrode active material layer face each other in plan view may be denoted as the first region. The region in which one of the electrode active material layer and the counter electrode active material layer is located in plan view may be denoted as the first region. When the region in which one of the electrode active material layer and the counter electrode active material layer is located in plan view is denoted as the first region, the reliability is further enhanced by forming the structural defect portion in the first region.

For example, in the embodiments above, a plurality of structural defect portions is formed in a battery, but the configuration is not limited thereto. At least one structural defect portion may be formed.

For example, in the embodiments above, the structural defect portion in plan view is a line-shaped groove, an arranged plurality of holes, or a slit, but the configuration is not limited thereto. The structural defect portion may be composed of two or more selected from the group consisting of grooves, arranged plurality of holes, and slits aligned in a line shape in plan view.

For example, in the embodiments above, the current collector includes a current collector layer, but the configuration is not limited thereto. When the substrate has conductivity and can extract a current from the active material layer, the current collector may be constituted of the substrate only without including a current collector layer. In such a case, the substrate and the active material layer are directly joined to each other.

In the embodiments above, the structural defect portion has a straight line shape in plan view, but the configuration is not limited thereto. The structural defect portion may be, for example, formed in a zig zag line shape or in a curved line shape, such as an arc or wave line.

For example, the structural defect portion may be formed in two or more of the substrate, the electrode current collector layer, the counter electrode current collector layer, and the solid electrolyte layer in the second region.

For example, the structural defect portion may be formed in the first region within a range of not impairing the effects of the present disclosure.

In the above-described embodiments, various changes, replacements, additions, omissions, etc. can be made within the scope of the claims or the equivalent thereof.

The battery according to the present disclosure can be used as, for example, a secondary battery, such as an all-solid lithium ion battery, which is used in various electronic devices or an automobile.

What is claimed is:

1. A battery comprising:
an electrode layer;
a counter electrode layer disposed to face the electrode layer; and
a solid electrolyte layer located between the electrode layer and the counter electrode layer, wherein;
the electrode layer includes:
  a current collector; and
  an active material layer located between the current collector and the solid electrolyte layer and having an area smaller than areas of the current collector and the solid electrolyte layer in plan view,
in the plan view, when a region where the active material layer is located is designated as a first region and a region outside the first region is designated as a second region,
the solid electrolyte layer covers an outside of the active material layer in the plan view and is in contact with the current collector in the second region, and
the current collector includes at least one structural defect portion having a line shape in the plan view located only in the second region,
the current collector includes:
  a current collector layer in contact with the active material layer; and
  a substrate in contact with a surface of the current collector layer opposite to a surface facing the active material layer, and the at least one structural defect portion is formed in the substrate.

2. The battery according to claim 1, wherein the at least one structural defect portion is formed on a surface of the substrate opposite to a surface facing the current collector layer.

3. The battery according to claim 1, wherein the current collector further includes:
an auxiliary substrate located in the first region and in contact with a surface of the substrate opposite to a surface facing the current collector layer.

4. A battery comprising:
an electrode layer;
a counter electrode layer disposed to face the electrode layer; and
a solid electrolyte layer located between the electrode layer and the counter electrode layer, wherein:
the electrode layer includes:
  a first current collector; and
  a first active material layer located between the first current collector and the solid electrolyte layer and having an area smaller than an area of the first current collector and an area of the solid electrolyte layer in plan view,
the counter electrode layer includes:
  a second current collector; and
  a second active material layer located between the second current collector and the solid electrolyte layer and having an area smaller than an area of the second current collector and the area of the solid electrolyte layer in the plan view,
in the plan view, when a region where the first active material layer and the second active material layer are located is designated as a first region and a region outside the first region is designated as a second region, no first active material layer and no second active material layer are located in the second region in the plan view,
the solid electrolyte layer covers a side surface of the first active material layer and a side surface of the second active material layer, disposed at an outside of the first and second active material layers in the plan view, and is in contact with the first and second current collectors in the second region,
at least one component selected from the group consisting of the first current collector, the second current collector and the solid electrolyte layer includes at least one structural defect portion having a line shape in the plan view located only in the second region, and
the line shape comprises at least two lines crossing each other and passing through each other in the plan view.

5. The battery according to claim 4, wherein the at least one structural defect portion is a line-shaped groove having a V-shape cross section, a U-shape cross section, a semicircular cross section or a concave shape cross section.

6. The battery according to claim 4, wherein each of the at least two lines comprises a plurality of holes linearly arranged.

7. The battery according to claim 4, wherein the at least one structural defect portion is a line-shaped slit passing through the at least one component.

8. The battery according to claim 4, wherein the at least one structural defect portion includes a plurality of structural defect portions, and each of the structural defect portions is formed along an outer periphery of the first region in the plan view.

9. The battery according to claim 4, wherein the at least one structural defect portion is formed so as to surround an outer periphery of the first region in the plan view.

10. The battery according to claim 4, wherein at least one of ends of the at least one structural defect portion corresponds to an outer periphery of the at least one component in the plan view.

11. The battery according to claim 4, wherein the solid electrolyte layer includes a solid electrolyte having a lithium ion conductivity.

12. The battery according to claim 4, wherein the at least one structural defect portion is formed in the solid electrolyte layer.

13. The battery according to claim 12, wherein the at least one structural defect portion is formed on a surface of the solid electrolyte layer facing one of the first current collector or the second current collector.

* * * * *